US009519451B2

(12) United States Patent
Imai et al.

(10) Patent No.: US 9,519,451 B2
(45) Date of Patent: Dec. 13, 2016

(54) COMMUNICATION SYSTEM AND INFORMATION PROCESSING DEVICE

(71) Applicants: Takuya Imai, Tokyo (JP); Masanori Ishigami, Tokyo (JP); Yoshinaga Kato, Kanagawa (JP); Kenichiro Morita, Tokyo (JP); Shoh Nagamine, Kanagawa (JP)

(72) Inventors: Takuya Imai, Tokyo (JP); Masanori Ishigami, Tokyo (JP); Yoshinaga Kato, Kanagawa (JP); Kenichiro Morita, Tokyo (JP); Shoh Nagamine, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 7 days.

(21) Appl. No.: 14/299,086

(22) Filed: Jun. 9, 2014

(65) Prior Publication Data

US 2014/0368410 A1 Dec. 18, 2014

(30) Foreign Application Priority Data

Jun. 12, 2013 (JP) ................................ 2013-123896
Oct. 7, 2013 (JP) ................................ 2013-210448
Jan. 31, 2014 (JP) ................................ 2014-016954

(51) Int. Cl.
*G09G 5/00* (2006.01)
*H04N 7/14* (2006.01)
(Continued)

(52) U.S. Cl.
CPC .......... *G06F 3/1415* (2013.01); *G06F 3/1454* (2013.01); *H04L 12/1822* (2013.01);
(Continued)

(58) Field of Classification Search
None
See application file for complete search history.

(56) References Cited

U.S. PATENT DOCUMENTS 8,839,292 B1 * 9/2014 Miloseski .......... H04N 21/4126 725/110
2004/0002049 A1 1/2004 Beavers et al.
(Continued)

FOREIGN PATENT DOCUMENTS

JP 2010-251919 11/2010
JP 2011-254453 12/2011
(Continued)

OTHER PUBLICATIONS

Extended European Search Report issued Oct. 23, 2014 in Patent Application No. 14171754.6.

*Primary Examiner* — Dismery Mercedes
(74) *Attorney, Agent, or Firm* — Oblon, McClelland, Maier & Neustadt, L.L.P.

(57) ABSTRACT

An information processing device includes a display control unit configured to display data in an area formed in a display unit connected to the information processing device, a display data acquiring unit configured to acquire the display data displayed in an operation reception area or an entire area, which is a target of receiving an operation by a user, an area forming unit configured to form a render reception area so as to be superposed on the operation reception area, a render receiving unit configured to receive rendering with respect to the render reception area, a render data acquiring unit configured to acquire render data rendered in the render reception area, a render data combining unit configured to combine the display data with the render data, and a data sending unit configured to send, to a terminal, the display data with which the render data has been combined.

18 Claims, 32 Drawing Sheets

(51) Int. Cl.
*G06F 3/14* (2006.01)
*H04L 12/18* (2006.01)
*G06F 3/0481* (2013.01)
*G09G 5/14* (2006.01)

(52) U.S. Cl.
CPC ............. *G06F 3/0481* (2013.01); *G09G 5/14* (2013.01); *G09G 2340/10* (2013.01); *G09G 2358/00* (2013.01)

(56) References Cited

U.S. PATENT DOCUMENTS

| | | | | |
|---|---|---|---|---|
| 2005/0012760 | A1* | 1/2005 | Yamamoto | G06T 11/60 345/636 |
| 2006/0291000 | A1* | 12/2006 | Maeda | G06T 11/60 358/452 |
| 2007/0058207 | A1* | 3/2007 | Asai | G06F 17/30056 358/296 |
| 2008/0115073 | A1* | 5/2008 | Erickson | G06F 3/038 715/766 |
| 2009/0292999 | A1* | 11/2009 | LaBine | G06F 3/1454 715/740 |
| 2010/0325577 | A1* | 12/2010 | Olsen | G06F 3/1423 715/792 |
| 2011/0234746 | A1* | 9/2011 | Saleh | G06F 3/041 348/14.03 |
| 2011/0314099 | A1 | 12/2011 | Imai et al. | |
| 2012/0084354 | A1* | 4/2012 | Shinomoto | G06F 3/048 709/203 |
| 2012/0140021 | A1 | 6/2012 | Tanaka et al. | |
| 2013/0038676 | A1 | 2/2013 | Tanaka et al. | |
| 2013/0063376 | A1* | 3/2013 | Oakley | G06F 3/041 345/173 |
| 2013/0103943 | A1* | 4/2013 | Hirsch | G09C 5/00 713/168 |
| 2013/0185356 | A1* | 7/2013 | Mizutani | H04L 12/1822 709/204 |
| 2013/0242033 | A1* | 9/2013 | Kato | H04N 7/15 348/14.08 |
| 2014/0055555 | A1 | 2/2014 | Imai | |
| 2014/0118475 | A1 | 5/2014 | Nagamine et al. | |
| 2014/0267339 | A1* | 9/2014 | Dowd | G06F 3/0414 345/581 |
| 2014/0306865 | A1* | 10/2014 | Pan | G06F 3/1423 345/2.1 |

FOREIGN PATENT DOCUMENTS

| | | |
|---|---|---|
| JP | 2012-134941 | 7/2012 |
| WO | WO 2009/140766 A1 | 11/2009 |

* cited by examiner

COMMUNICATION MANAGEMENT SYSTEM 50
(RELAY DEVICE 30, EXTERNAL INPUT DEVICE 40)

| TYPE OF EVENT | SHARE FLAG | DISPLAY CONTROL FLAG |
|---|---|---|
| DISTRIBUTION START EVENT | SHARED | SHARED |
| DISTRIBUTION START EVENT FROM OTHER | SHARED | SHARED_ANOTHER |
| DISTRIBUTION STOP EVENT | UNSHARED | UNSHARED |
| DISTRIBUTION STOP EVENT FROM OTHER | UNSHARED | UNSHARED |

| ARRANGEMENT INFORMATION NO. | ARRANGEMENT INFORMATION | SHARE FLAG |
|---|---|---|
| 1 | VIEW_MULTI | UNSHARED |
| 2 | SHARED_MULTI | SHARED |

FIG.7C

| ARRANGEMENT INFORMATION | AREA A21 | AREA A22 | AREA A23 | AREA A24 |
|---|---|---|---|---|
| VIEW_MULTI | IMAGE DATA 1 | IMAGE DATA 2 | .. | |
| SHARED_MULTI | DISPLAY DATA | VIDEO DATA 1 | IMAGE DATA 2 | .. |

FIG.7D

| | |
|---|---|
| A21 | A22 |
| | A23 |
| | A24 |

FIG.8

RELAY DEVICE MANAGEMENT TABLE

| RELAY DEVICE ID | OPERATION STATE | RECEPTION DATE | IP ADDRESS OF RELAY DEVICE | MAXIMUM DATA COMMUNICATION SPEED (Mbps) |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.3.2.2 | 10 |

FIG.9

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG.10

TERMINAL STATE MANAGEMENT TABLE

| TERMINAL ID | OPERATION STATE | RECEPTION DATE | IP ADDRESS OF TERMINAL |
|---|---|---|---|
| 01aa | ONLINE | 2009.11.10.13:40 | 1.2.1.3 |
| 01ab | OFFLINE | 2009.11.09.12:00 | 1.2.1.4 |
| 01ba | ONLINE | 2009.11.10.13:45 | 1.2.2.3 |
| ... | ... | ... | ... |
| 01db | ONLINE | 2009.11.10.13:50 | 1.3.2.4 |

FIG.11

DESTINATION LIST MANAGEMENT TABLE

| REQUEST SOURCE TERMINAL ID | DESTINATION TERMINAL ID |
|---|---|
| 01aa | 01ab,01ba,01db |
| 01ab | 01aa,01ba,01ca |
| 01ba | 01aa,01ab,01cb,01da |
| ... | ... |
| 01db | 01aa,01ab,01da |

FIG.12

SESSION MANAGEMENT TABLE

| SESSION ID FOR SELECTION | RELAY DEVICE ID | REQUEST SOURCE TERMINAL ID | DESTINATION TERMINAL ID | DELAY TIME (ms) | DELAY INFORMATION RECEPTION DATE |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG.24

[IN CASE OF LINE TYPE: 1: NEW OR 2: CONTINUED]

| LINE TYPE | LINE NUMBER | x ABSOLUTE COORDINATE | y ABSOLUTE COORDINATE | x RELATIVE COORDINATE | y RELATIVE COORDINATE | PEN TYPE | PEN WIDTH | COLOR |
|---|---|---|---|---|---|---|---|---|
| EXAMPLE | | | | | | | | |
| 1: NEW | 1 | 980 | 230 | 0.953 | 0.299 | BRUSH | 5pt | BLACK |
| 2: CONTINUED | 2 | 960 | 256 | 0.934 | 0.333 | BRUSH | 5pt | BLACK |
| 2: CONTINUED | 3 | 970 | 289 | 0.944 | 0.376 | BRUSH | 5pt | BLACK |
| 2: CONTINUED | 4 | 972 | 360 | 0.946 | 0.469 | BRUSH | 5pt | BLACK |
| 1: NEW | 5 | 340 | 622 | 0.331 | 0.810 | PEN | 3pt | RED |
| 2: CONTINUED | 6 | 360 | 625 | 0.350 | 0.814 | PEN | 3pt | RED |
| | | | | | | | | |

[IN CASE OF LINE TYPE: 3: ERASE]

| LINE TYPE | LINE NUMBER | START LINE NUMBER | END LINE NUMBER | | | | | |
|---|---|---|---|---|---|---|---|---|
| EXAMPLE | | | | | | | | |
| 3: ERASE | 7 | 5 | 6 | | | | | |
| | | | | | | | | |

[IN CASE OF LINE TYPE: 4: ERASE ALL]

| LINE TYPE | LINE NUMBER | | | | | | | |
|---|---|---|---|---|---|---|---|---|
| EXAMPLE | | | | | | | | |
| 4: ERASE ALL | 8 | | | | | | | |

COMMUNICATION SYSTEM AND INFORMATION PROCESSING DEVICE

BACKGROUND OF THE INVENTION

1. Field of the Invention

The present invention relates to a communication system including an information processing device that is communicably connected with a terminal.

2. Description of the Related Art

There is known a remote conference system in which image data and voice data are transmitted/received between communication terminals provided with a camera and a microphone, and users at remote locations have a conference with each other. Each communication terminal displays, on a display, image data which is sent from a communication terminal of another attendee of the conference, and outputs voice sound from the speaker. Accordingly, users at a plurality of locations can have a conference in the same manner as having a conference in the same conference room.

In the remote conference system, if a communication terminal can send, to another communication terminal, a screen that a PC (Personal Computer) connected to the communication terminal to display on the display, the application screen of the PC can be shared among communication terminals (see, for example, Patent Document 1).

FIG. 33 illustrates an example of a schematic configuration diagram of a remote conference system in which the screen displayed on the display of the PC can be shared. The screen of a display 120*aa* connected to a communication terminal 10*aa* is divided into several areas A21 through A24. The area A21 displays display data that is displayed on a display 208*aa* by an external input device 40*aa*, the area A22 displays image data taken by a camera of a communication terminal 10*db*, and the area A23 displays image data taken by a camera of a communication terminal 10*aa*. The display data in the area A21 and the image data taken by the camera of the communication terminal 10*aa* in the area A23 are sent to the communication terminal 10*db*, and displayed on a display 120*db*.

Therefore, a user aa and a user db at remote locations can have a conference by viewing a document of an application displayed by the external input device 40*aa*.

However, in such a remote conference system, it is not possible to render handwritten memos on the screen of the external input device 40*aa*. In the case of materials that physically exist, the attendee can write circles and underlines in the material; however, this is difficult in the case of a remote conference system, and therefore it is difficult to indicate diagrams and writing in the material, and communication cannot be efficiently performed.

There is devised a conference support system for sending the handwritten memo of an attendee to another device, in which the handwritten memo, which is to be applied to conference material displayed on a liquid crystal display, is saved as a layer, and the layer is combined with the conference material and distributed (see, for example, Patent Document 2).

However, in the conference support system described in Patent Document 2, the area for rendering the handwritten memo and the position of the conference material are fixed, and therefore there are several inconveniences. For example, an external input device such as a PC displays several applications in respective windows (hereinafter, "areas"), and the size of the area can be arbitrarily changed by the user. Therefore, in order to fully receive the handwritten memo with respect to an area, there is a need to create a handwritten memo area having a size that is at least greater than or equal to the corresponding area. In an attempt to eliminate the need of a process of creating such an area, the entire display may be set as the handwritten memo area instead of just a certain area; however, in this case, areas that the user does not want to share may be unintentionally shared. Furthermore, when there are no blank spaces in the conference material, there is not enough space for writing memos, and therefore the user may want to increase the handwritten memo area to be used for writing memos.

As described above, in the conference support system described in Patent Document 2 in which the area for handwritten memos and the position of the conference material are fixed, there is a problem in that consideration is not made for cases where there are areas of various sizes and cases where there are a plurality of areas.

Patent Document 1: Japanese Laid-Open Patent Publication No. 2011-254453

Patent Document 2: Japanese Laid-Open Patent Publication No. 2010-251919

SUMMARY OF THE INVENTION

The present invention provides a communication system including an information processing device, in which one or more of the above-described disadvantages are eliminated.

According to an aspect of the present invention, there is provided a communication system including a terminal; an information processing device that is communicably connected with the terminal; and another terminal that is communicably connected with the terminal via a network, wherein the information processing device includes a firsts display control unit configured to display data in an arbitrary area formed in a first display unit connected to the information processing device, a display data acquiring unit configured to acquire the display data displayed in an operation reception area or an entire area, which is a target of receiving an operation by a user, an area forming unit configured to form a render reception area so as to be superposed on at least part of the operation reception area, a render receiving unit configured to receive rendering with respect to the render reception area, a render data acquiring unit configured to acquire render data rendered in the render reception area, a first render data combining unit configured to combine the display data with the render data, and a first data sending unit configured to send, to the terminal, the display data with which the render data has been combined by the first render data combining unit, wherein the terminal includes a data receiving unit configured to receive the display data with which the render data has been combined by the first render data combining unit, a second display control unit configured to display the display data on a second display unit connected to the terminal, and a second data sending unit configured to send the display data to the another terminal.

According to an aspect of the present invention, there is provided an information processing device that is communicably connected with a terminal, wherein the terminal includes a data receiving unit configured to receive display data from the information processing device, a second display control unit configured to display the display data on a second display unit connected to the terminal, and a second data sending unit configured to send the display data to another terminal that is communicably connected with the terminal via a network, wherein the information processing device includes a first display control unit configured to display data in an arbitrary area formed in a first display unit connected to the information processing device, a display data acquiring unit configured to acquire the display data displayed in an operation reception area or an entire area, which is a target of receiving an operation by a user, an area forming unit configured to form a render reception area so as to be superposed on at least part of the operation reception area, a render receiving unit configured to receive rendering with respect to the render reception area, a render data acquiring unit configured to acquire render data rendered in the render reception area, a first render data combining unit configured to combine the display data with the render data, and a first data sending unit configured to send, to the terminal, the display data with which the render data has been combined by the first render data combining unit.

According to an aspect of the present invention, there is provided a non-transitory computer-readable recording medium storing a program that causes an information processing device to execute a process, the information processing device being communicably connected with a terminal, wherein the terminal includes a data receiving unit configured to receive display data from the information processing device, a second display control unit configured to display the display data on a second display unit connected to the terminal, and a second data sending unit configured to send the display data to another terminal that is communicably connected with the terminal via a network, wherein the program causes the information processing device to execute a first display control step of displaying display data in an arbitrary area formed in a first display unit connected to the information processing device, a display data acquiring step of acquiring the display data displayed in an operation reception area or an entire area, which is a target of receiving an operation by a user, an area forming step of forming a render reception area in which the display data is visible, such that the render reception area is superposed on at least part of the operation reception area, a render receiving step of receiving rendering with respect to the render reception area, a render data acquiring step of acquiring render data rendered in the render reception area, a first render data combining step of combining the display data with the render data, and a first data sending step of sending, to the terminal, the display data with which the render data has been combined at the first render data combining step.

BRIEF DESCRIPTION OF THE DRAWINGS

Other objects, features and advantages of the present invention will become more apparent from the following detailed description when read in conjunction with the accompanying drawings, in which:

FIGS. 7A through 7D illustrate examples of an event flag table;

FIG. 8 is a conceptual diagram of a relay device management table;

FIG. 9 is a conceptual diagram of a terminal authentication management table;

FIG. 10 is a conceptual diagram of a terminal state management table;

FIG. 11 is a conceptual diagram of a destination list management table;

FIG. 12 is a conceptual diagram of a session management table;

FIG. 24 illustrates an example of a saving format of the render data;

DETAILED DESCRIPTION OF THE PREFERRED EMBODIMENTS

First Embodiment

Figure 1:
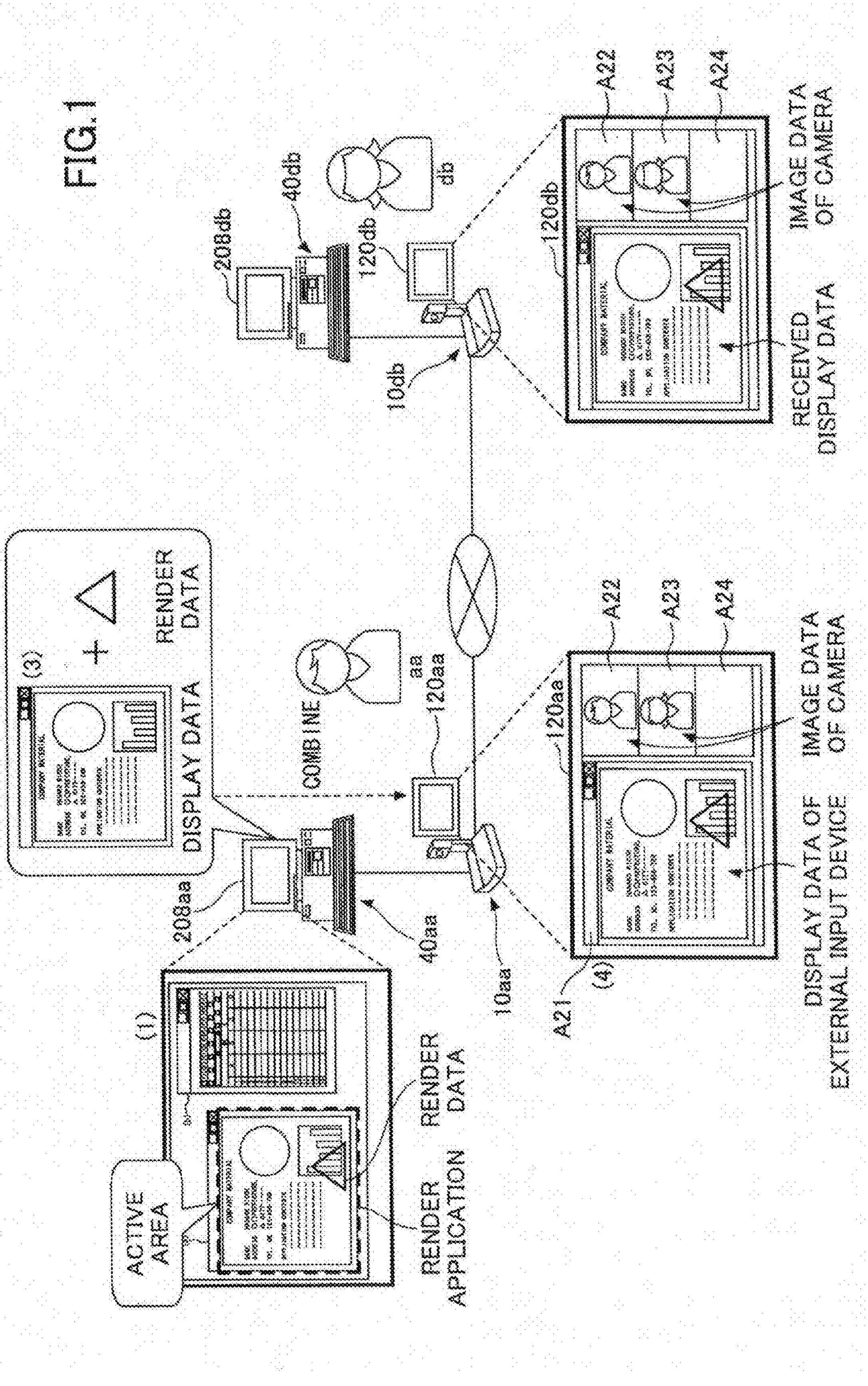
FIG. 1 schematically illustrates an example of the outline of operations of a communication system according to a first embodiment.

FIG. 1 schematically illustrates an example of the outline of operations of a communication system according to the present embodiment.

A communication terminal 10*aa* and a communication terminal 10*db* are connected to each other via a communication network. To the communication terminal 10*aa*, an external input device 40*aa* is connected, and to the communication terminal 10*db*, an external input device 40*db* is connected.

(1) A user aa operates the external input device 40*aa* and displays, on a display 208*aa*, an area (a) and an area (b) that are created by an arbitrary application.

(2) The user aa can activate a render application for receiving a handwritten memo. The area of the render application (render reception area) is formed by the same size and at the same position as an active area (an area for receiving input and operations from a user; operation reception area). The area of the render application is transparent, and therefore the user aa can visibly see the active area. The user aa can render lines, curves, basic diagrams, characters, symbols, etc., in the area of the render application by using a mouse and a touch panel. In FIG. 1, a triangle is rendered in an active area (a).

(3) The external input device 40*aa* takes in the information displayed in the active area. The data taken in is referred to as display data. Furthermore, the external input device 40*aa* takes in the information rendered in the area of the render application. The data taken in is referred to as render data. The external input device 40*aa* writes the render data on the display data and sends the data to the communication terminal 10*aa*.

(4) In the same manner as the conventional technology, the communication terminal 10*aa* displays the display data in the area A21, displays image data taken by the camera of the communication terminal 10*aa* in the area A23, and displays the image data taken by the camera of the communication terminal 10*db* in the area A22.

As described above, the render application of the external input device 40*aa* can identify an active area and create an area of the render application having the same size and position as the identified active area, no matter what the size and position of the active area are. Therefore, it is possible to combine rendered contents obtained by rendering diagrams with the display data, and share the combined data with other communication terminals, while sharing only the display data of the application that the user aa wants to share. Furthermore, if the active area is switched, the display data to be taken in is switched to that of the active area, and the area of the render application is automatically superposed on the active area, and therefore the user aa can always render diagrams in the display data that is being shared. Furthermore, the user aa can arbitrarily change the size/position of the area of the render application, and therefore even if diagrams are rendered outside the active area, the rendered contents can be combined with the display data and shared with other users.

Overall Configuration of Embodiment

Figure 2:
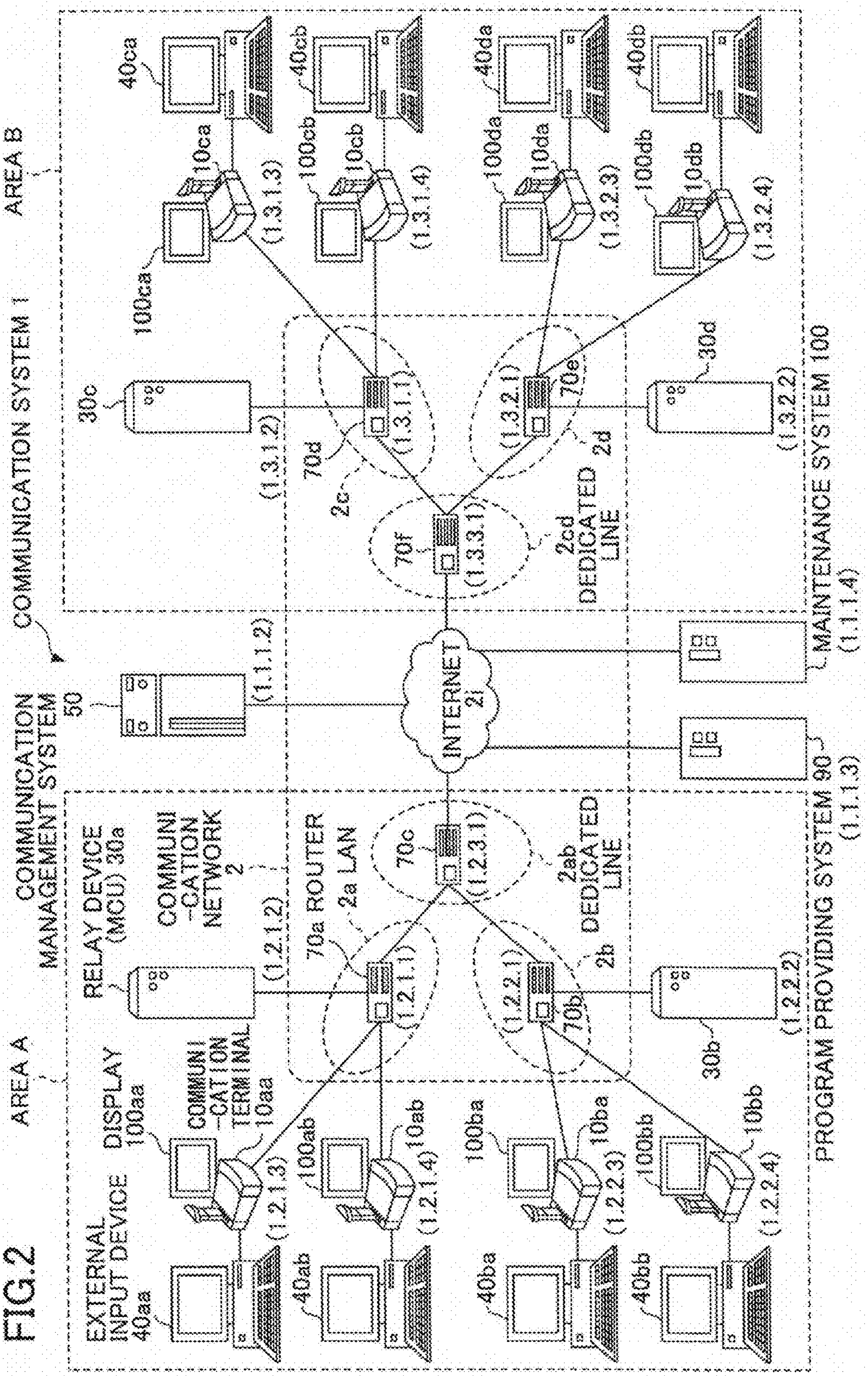
FIG. 2 is a schematic diagram illustrating the overall configuration of a communication system according to an embodiment of the present invention.

FIG. 2 is a schematic diagram illustrating the overall configuration of a communication system 1 according to an embodiment of the present invention. In the following, a description is given of the present embodiment with reference to FIG. 2.

Generally, the communication system 1 includes a data providing system for communicating contents data in one direction from one communication terminal to another communication terminal via a communication management system 50, and a communication system for transmitting information and feelings between a plurality of communication terminals via the communication management system 50. The communication system is a system for transmitting information and feelings between a plurality of communication terminals via a communication management system. Examples of the communication system are a TV or video conference system, a TV telephone system, a voice conference system, a voice telephone system, and a PC (Personal computer) screen sharing system.

In the present embodiment, a description is given of a communication system, a communication management system, and a communication terminal, assuming a TV or video conference system as an example of the communication system, a TV or video conference management system as an example of the communication management system, and a TV or video conference terminal as an example of a communication terminal. That is to say, the communication terminal and communication management system according to an embodiment of the present invention are not only applied to a TV or video conference system, but also to a communication system.

The communication system 1 (see FIG. 2) according to the present embodiment includes a plurality of communication terminals 10*aa*, 10*ab*, 10*ba*, 10*bb*, 10*ca*, 10*cb*, 10*da*, and 10*db*, a plurality of displays of the communication terminals 120*aa*, 120*ab*, 120*ba*, 120*bb*, 120*ca*, 120*cb*, 120*da*, and 120*db*, a plurality of external input devices such as PCs 40*aa*, 40*ab*, 40*ba*, 40*bb*, 40*ca*, 40*cb*, 40*da*, and 40*db* which are respectively connected to the communication terminals, a plurality of relay devices 30*a*, 30*b*, 30*c*, and 30*d*, the communication management system 50, a program providing system 90, and a maintenance system 100.

Note that unless particularly mentioned in the following description, among the plurality of communication terminals 10*aa* through 10*db*, an arbitrary communication terminal is referred to as a "communication terminal 10", among the plurality of displays 120*aa* through 120*db*, an arbitrary display is referred to as a "display 120", among the plurality of external input devices 40*aa* through 40*db*, an arbitrary external input device is referred to as an "external input device 40", and among the plurality of relay devices 30*a* through 30*d*, an arbitrary relay device is referred to as a "relay device 30". Furthermore, the display 120 is an example of a display device of the communication terminal 10.

The communication terminal 10 performs transmission/reception of image data, voice data, etc., with other communication terminals 10. In the present embodiment, a description is given of a case where the image of the image data is a video; however, the image data may be a still image other than a video. Furthermore, the images of the image data may include both a video and still images. The relay device 30 performs relaying of image data and voice data between a plurality of communication terminals 10. The communication management system 50 manages the communication terminals 10 and the relay devices 30 in an integrated manner. Note that the communication terminal 10 illustrated in FIG. 2 has an external display 120; however, the display 120 may be built in the communication terminal 10. Furthermore, regardless of whether the display 120 is built in or not, the communication terminal 10 may have a projector and project the display contents of the display 120 by the projector.

The external input device 40 is connected to the communication terminal 10, and transmits display data for displaying material data to the communication terminal 10. Material data means, for example, data used with the use of word-processing software, spreadsheet software, and presentation software. The external input device 40 is, for example, a PC, but may be information processing devices such as a tablet, a smartphone, and a PDA (Personal Data Assistant).

Furthermore, the plurality of routers (70*a*, 70*b*, . . . , 70*f*) illustrated in FIG. 2 are for selecting the optimum route for the image data and voice data. Note that in the present embodiment, among the plurality of routers (70*a*, 70*b*, . . . , 70*f*), an arbitrary router is referred to as a "router 70".

The program providing system 90 includes a HDD (Hard Disk Drive) (not illustrated), storing programs for communication terminals for causing the communication terminal 10 to realize various functions or various means, and can send programs for communication terminals to the communication terminal 10. Furthermore, the HDD of the program providing system 90 also stores programs for the relay devices for causing the relay device 30 to realize various functions or various means, and can send the programs for the relay devices to the relay device 30. Furthermore, the HDD of the program providing system 90 also stores programs for remote communication management, for causing the communication management system 50 to realize various functions or various means, and can send programs for remote communication management to the communication management system 50.

Furthermore, the communication terminal 10*aa*, the communication terminal 10*ab*, the relay device 30*a*, and the router 70*a* are communicably connected to each other by a LAN 2*a*. The communication terminal 10*ba*, the communication terminal 10*bb*, the relay device 30*b*, and the router 70*b* are communicably connected to each other by a LAN 2*b*. Furthermore, the LAN 2*a* and the LAN 2*b* are communicably connected to each other by a dedicated line 2*ab* including the router 70*c*, and are located in a predetermined area A. For example, the area A is Japan, the LAN 2*a* is in an office in Tokyo, and the LAN 2*b* is in an office in Osaka.

Meanwhile, the communication terminal 10*ca*, the communication terminal 10*cb*, the relay device 30*c*, and the router 70*d* are communicably connected to each other by a LAN 2*c*. The communication terminal 10*da*, the communication terminal 10*db*, the relay device 30*d*, and the router 70*e* are communicably connected to each other by a LAN 2*d*. Furthermore, the LAN 2*c* and the LAN 2*d* are communicably connected to each other by a dedicated line 2*cd* including the router 70*f*, and are located in a predetermined area B. For example, the area B is the US, the LAN 2*c* is in an office in New York, and the LAN 2*d* is in an office in Washington D.C.

The area A and the area B are communicably connected to each other by the routers (70*c*, 70*f*) via the Internet 2*i*.

Furthermore, the communication management system 50, the program providing system 90, and the maintenance system 100 are communicably connected to the communication terminal 10 and the relay device 30 via the Internet 2*i*. The communication management system 50, the program providing system 90, and the maintenance system 100 may be provided in the area A or the area B, or may be provided in areas other than these areas.

Note that in the present embodiment, a communication network 2 according to the present embodiment includes the LAN 2*a*, the LAN 2*b*, the exclusive line 2*ab*, the Internet 2*i*, the exclusive line 2*cd*, the LAN 2*c*, and the LAN 2*d*. The communication network 2 may have portions where not only wired communication is performed, but also where wireless communication is performed, such as WiFi (Wireless Fidelity) and Bluetooth®.

Furthermore, in FIG. 2, the four numbers indicated below each communication terminal 10, each relay device 30, the communication management system 50, each router 70, the program providing system 90, and the maintenance system 100 indicate the IP address in a general IPv4 in a simplified manner. For example, the IP address of the communication terminal 10*aa* is "1.2.1.3". Furthermore, IPv6 may be used instead of IPv4. For simplifying the description, IPv4 is used.

Figure 3:
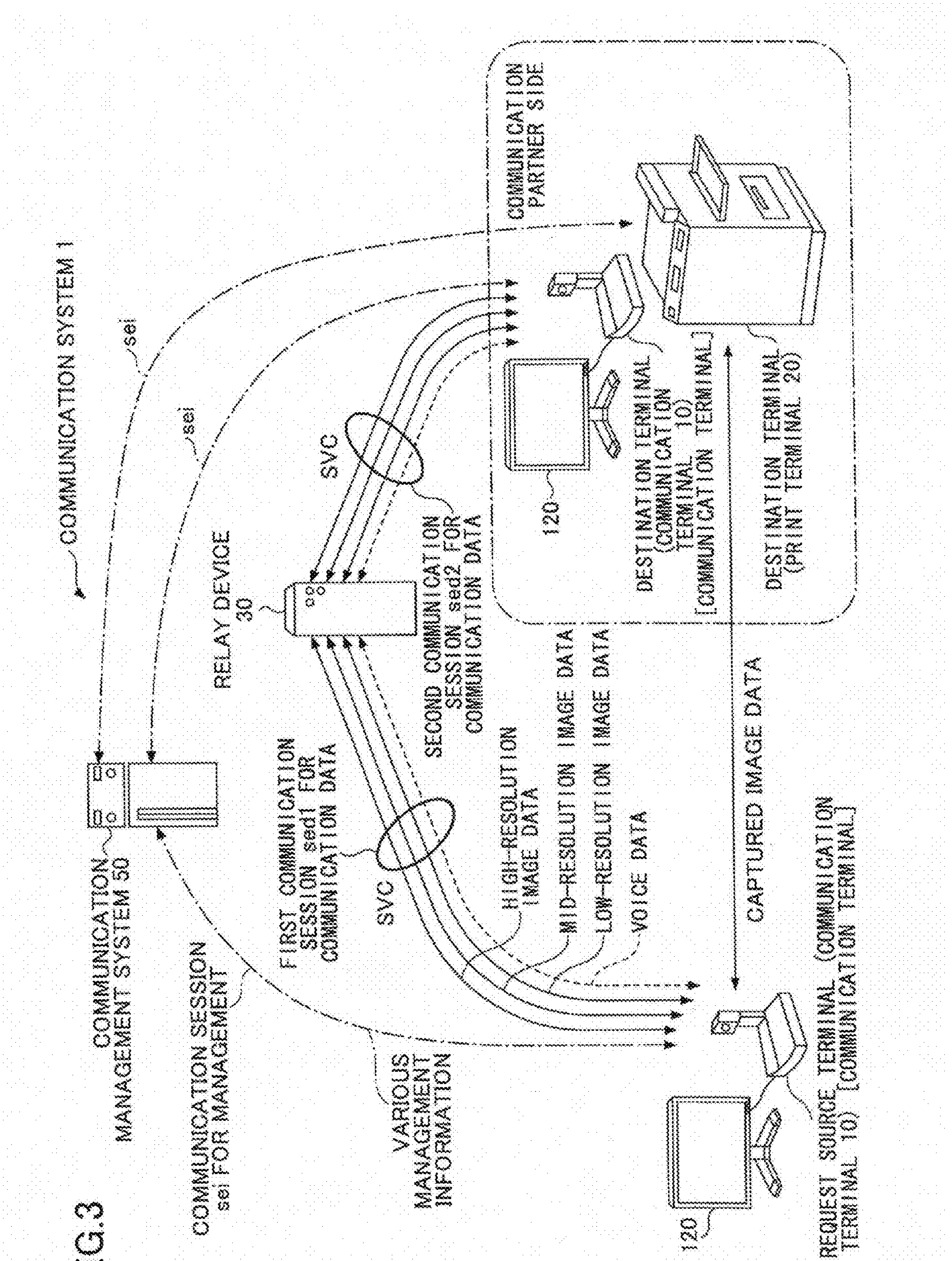
FIG. 3 is a conceptual diagram indicating the communication status in the case of realizing communication between communication terminals.

Next, with reference to FIG. 3, a description is given of the communication status in a case of realizing communication between two communication terminals. Note that FIG. 3 is a conceptual diagram indicating the communication status in the case of realizing communication between communication terminals.

In the communication system 1, transmission/reception of various data for communication is performed between a request source terminal (communication terminal 10) which is the request source of starting communication, and a destination terminal (communication terminal 10) that is the communication partner of the request source terminal. Furthermore, print data is sent from the request source terminal (communication terminal 10) to a print terminal 20 that is the communication partner of the request source terminal, and the print data is printed onto a sheet at the print terminal 20. The communication terminal 10 mainly has a function for communicating, and the print terminal 20 mainly has a function for printing, and thus have different processing capacities.

Furthermore, a communication session set for management for transmitting/receiving various kinds of management information is established between the request source terminal and the communication management system 50, between the destination terminal (communication terminal 10) and the communication management system 50, and between the destination terminal (print terminal 20) and the communication management system 50. Furthermore, the communication session sei is also a communication session for call control.

Furthermore, each communication terminal 10 communicates the communication data by using a communication method according to a predetermined call control method and an encoding method via the relay device 30.

Examples of the call control method are (1) SIP (Session Initiation Protocol), (2) H.323, (3) a protocol obtained by expanding SIP, (4) a protocol of an instant messenger, (5) a protocol using a MESSAGE method of SIP, (6) a protocol of Internet Relay Chat (IRC), and (7) a protocol obtained by expanding the protocol of the instant messenger. Among these, the (4) a protocol of an instant messenger is, for example, a protocol used in (4-1) XMPP (Extensible Messaging and Presence Protocol), or (4-2) ICQ®, AIM®, or Skype®. Furthermore, (7) a protocol obtained by expanding the protocol of the instant messenger is, for example, Jingle.

Examples of the encoding method are H.264/SVC (Scalable Video Coding), and H.264/AVC (Advanced Video Coding). Specifically, when the encoding method is H.264/SVC, between the communication terminal 10 acting as the request source terminal and the relay device 30, a first communication session sed1 for communication is established, which is for transmitting/receiving our types of communication data including high-resolution image data, mid-resolution image data, low-resolution image data, and voice data. Furthermore, between the relay device 30 and the communication terminal 10 acting as the destination terminal, a second communication session sed2 for communication is established, which is for transmitting/receiving four types of communication data including high-resolution image data, mid-resolution image data, low-resolution image data, and voice data.

Hardware Configuration

Figure 4:
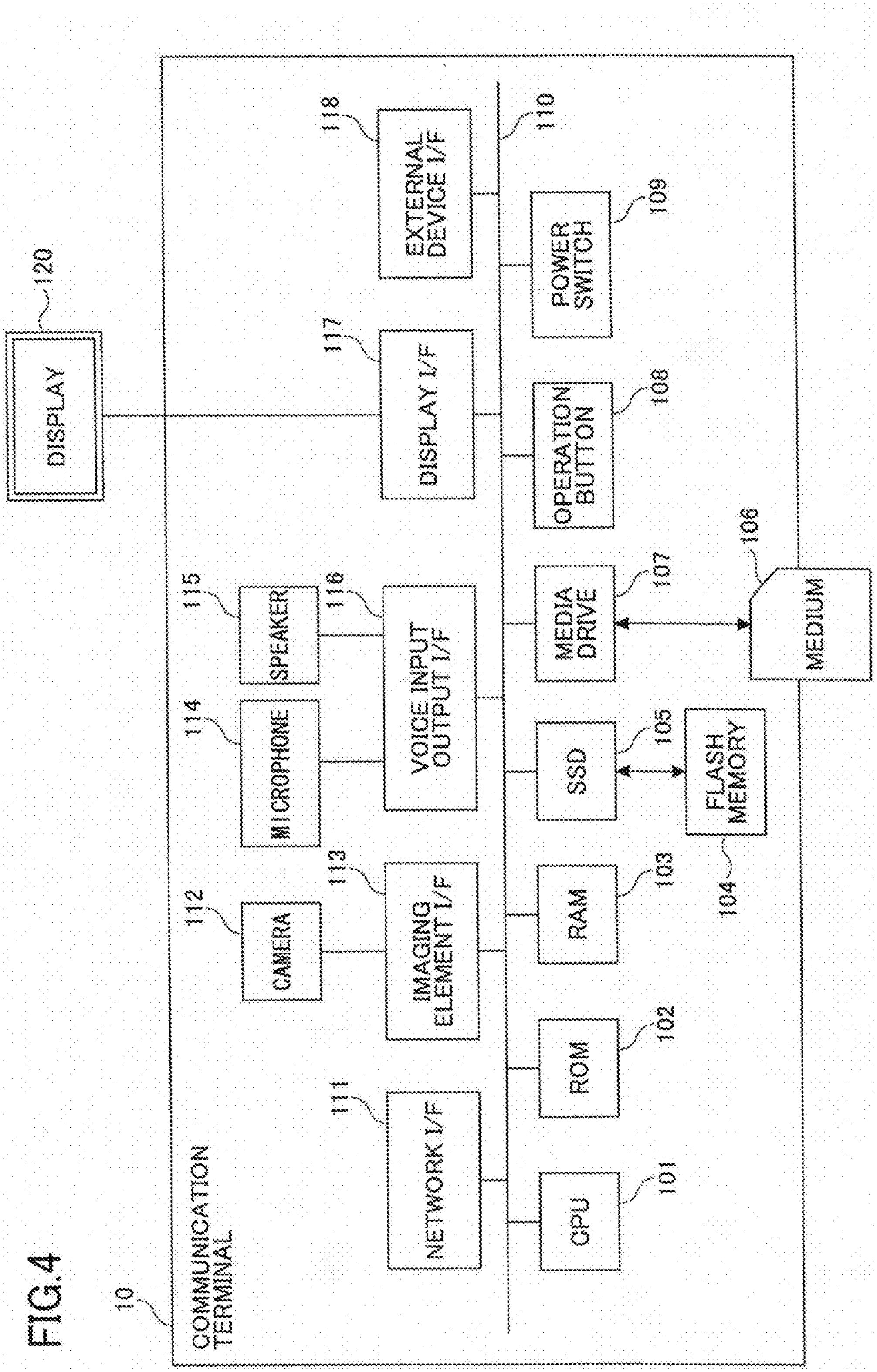
FIG. 4 is a hardware configuration diagram of the communication terminal constituting the communication system according to the first embodiment.

Next, a description is given of a hardware configuration according to the present embodiment. FIG. 4 is a hardware configuration diagram of the communication terminal 10 constituting the communication system 1 according to the present embodiment. As illustrated in FIG. 4, the communication terminal 10 includes a CPU (Central Processing Unit) 101 for controlling the operations of the entire communication terminal 10, a ROM (Read Only Memory) 102 storing programs for communication terminals, a RAM (Random Access Memory) 103 used as a work area of the CPU 101, a flash memory 104 for storing various data such as an image data and voice data, a SSD (Solid State Drive) 105 for controlling the reading and writing of various data with respect to the flash memory 104 according to control by the CPU 101, a media drive 107 for controlling the reading or writing (storing) of data with respect to a recording medium 106 such as a flash memory, an operation button 108 that is operated when selecting a destination of the communication terminal 10, a power switch 109 for switching the power of the communication terminal 10 between ON/OFF, a network I/F 111 for transmitting data with the use of a communication network 2 described below, a camera 112 for taking a picture of the surrounding area including a subject according to control by the CPU 101 and obtaining image data, an imaging element I/F 113 for controlling the driving of the camera 112, a microphone 114 for inputting voice sound, a speaker 115 for outputting voice sound, a voice input output I/F 116 for processing the input and output of voice signals between the microphone 114 and the speaker 115 according to control by the CPU 101, a display I/F 117 for transmitting image data to an external display 120 according to control by the CPU 101, an external device I/F 118 for transmitting and receiving various data between an external device, and a bus line 110 such as an address bus and a data bus for electrically connecting the above configuration elements with each other.

Note that the recording medium 106 is detachably attached to the communication terminal 10. Furthermore, if the recording medium 106 is a non-volatile memory that reads or writes data according to control by the CPU 101, the recording medium 106 is not limited to the flash memory 104 technology; the recording medium 106 may be an EEPROM (Electrically Erasable and Programmable ROM). Furthermore, the camera 112 includes a solid-state image sensing device for computerizing the image (video) of the subject by converting light into electric charges, such as a CCD (Charge Coupled Device) element, and a CMOS (Complementary Metal Oxide Semiconductor) element. Furthermore, a HDD (Hard Disk Drive) may be used other than the SSD 105.

Furthermore, the display 120 is constituted by a liquid crystal element and an organic EL element for displaying an image of a subject and icons used for operations.

Note that the external device I/F 118 may be electronically connected, by a USB (Universal Serial Bus) cable, to an external device such as an external camera, an external microphone, and an external speaker. When an external camera is connected, the external camera is operated according to control by the CPU 101, in priority to the built-in camera 112. Similarly, when an external microphone is connected, and when an external speaker is connected, the external microphone and the external speaker are operated according to control by the CPU 101, in priority to the built-in microphone 114 and the built-in speaker 115, respectively.

Furthermore, the above programs for communication terminals may be distributed by being recorded in a computer-readable recording medium such as the recording medium 106, in a file having an installable format or an executable format.

Note that the camera 112, the microphone 114, and the speaker 115 may not necessarily be built in; but may be externally connected. Furthermore, the communication terminal 10 may be a PC, a smartphone, a tablet terminal, and a mobile phone.

Figure 5:
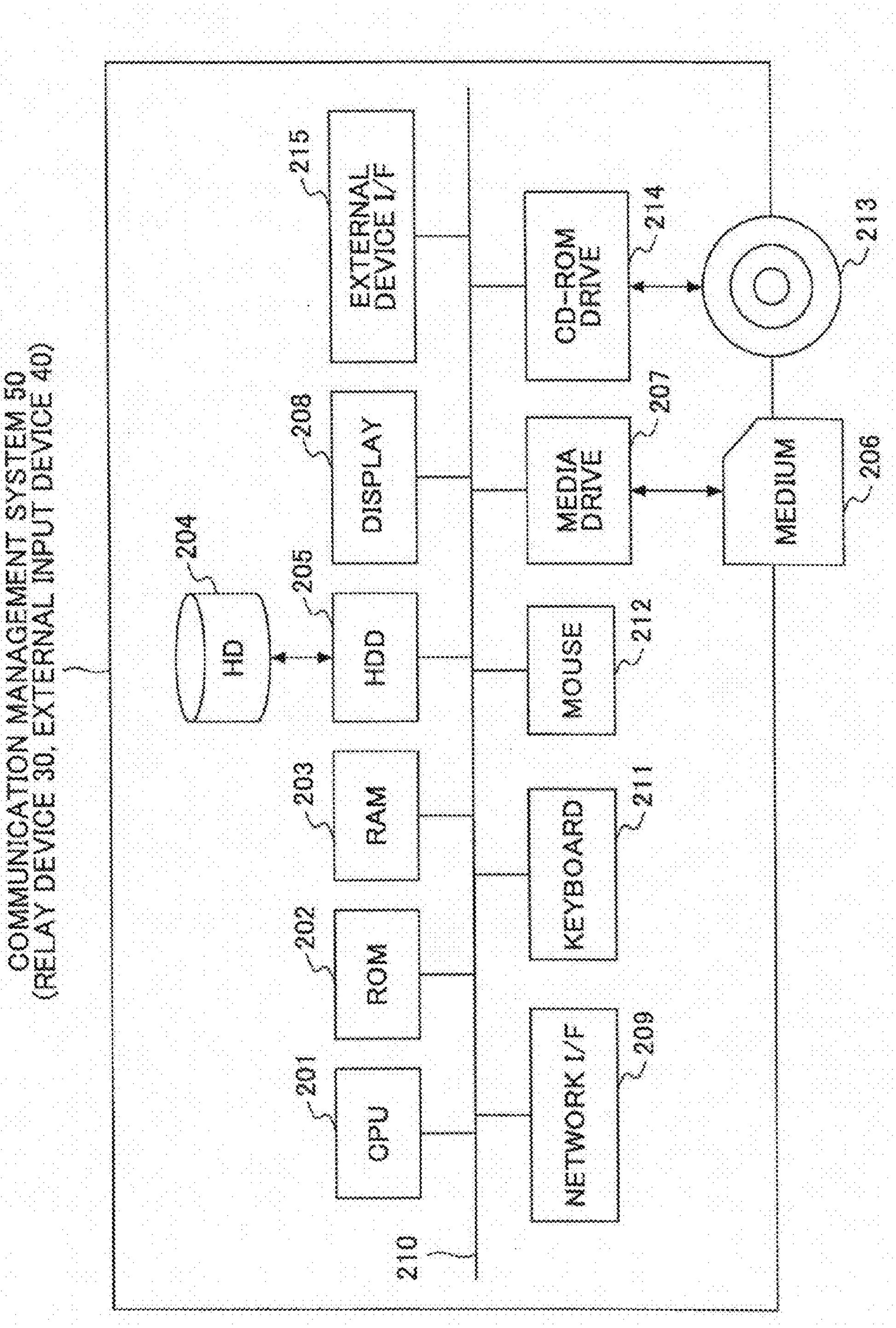
FIG. 5 is a hardware configuration diagram of a communication management system constituting the communication system according to the first embodiment.

FIG. 5 is a hardware configuration diagram of the communication management system 50 constituting the communication system 1 according to the present embodiment. The communication management system 50 includes a CPU 201 for controlling the operations of the entire communication management system 50, a ROM 202 storing programs for communication management, a RAM 203 used as a work area of the CPU 201, a HD (Hard Disk) 204 for storing various data, a HDD 205 for controlling the reading and writing of various data with respect to the HD 204 according to control by the CPU 201, a media drive 207 for controlling the reading or writing (storing) of data with respect to a recording medium 206 such as a flash memory, a display I/F (not shown) for displaying, on a display 208, various information such as a cursor, menus, windows, characters, and images, a network I/F 209 for transmitting data with the use of the communication network 2 described below, a keyboard 211 including a plurality of keys for inputting characters, values, and various instructions, a mouse 212 for selecting and executing various instructions, selecting a processing target, and moving the cursor, a CD-ROM drive 214 for controlling the reading and writing of data with respect to a CD-ROM (Compact Disc Read Only Memory) 213 that is an example of a detachably attached recording medium, an external device I/F 215 for transmitting and receiving information with an external device, and a bus line 210 such as an address bus and a data bus for electrically connecting the above configuration elements with each other. Note that the display 208 is also an example of a display device of the external input device 40. Examples of the external device I/F 215 are a USB interface, BlueTooth®, NFC (Near Field Communication) and TransferJet®.

Note that the above programs for communication management may be distributed by being recorded in a computer-readable recording medium such as the recording medium 206 and the CD-ROM 213, in a file having an installable format or an executable format. The programs for communication management may be stored in the HD 204.

Furthermore, the external input device 40 has the same hardware configuration as that of the communication management system 50, and therefore descriptions thereof are omitted. However, the ROM 202 stores programs for an external input device for controlling the external input device 40. In this case also, the programs for an external input device may be distributed by being recorded in a computer-readable recording medium such as the recording medium 206 and the CD-ROM 213, in a file having an installable format or an executable format.

Furthermore, the relay device 30 has the same hardware configuration as that of the communication management system 50, and therefore descriptions thereof are omitted. However, the ROM 202 stores a program for a relay device, for controlling the relay device 30. In this case also, the programs for a relay device may be distributed by being recorded in a computer-readable recording medium such as the recording medium 206 and the CD-ROM 213, in a file having an installable format or an executable format.

Furthermore, the program providing system 90 has the same hardware configuration as that of the communication management system 50, and therefore descriptions thereof are omitted. However, the ROM 202 stores a program for a program providing system, for controlling the program providing system 90. In this case also, the programs for a program providing system may be distributed by being recorded in a computer-readable recording medium such as the recording medium 206 and the CD-ROM 213, in a file having an installable format or an executable format. Note that the programs for a program providing system may be stored in the HD 204 instead of the ROM 202.

Furthermore, the maintenance system 100 has the same hardware configuration as that of the communication management system 50, and therefore descriptions thereof are omitted. The maintenance system 100 is a computer for performing maintenance, management, or repair on at least one of the communication terminal 10, the relay device 30, the communication management system 50, and the program providing system 90. For example, when the maintenance system 100 is provided domestically, and the communication terminal 10, the relay device 30, the communication management system 50, or the program providing system 90 is provided abroad, the maintenance system 100 performs, in a remote manner via the communication network 2, the maintenance, management, or repair on at least one of the communication terminal 10, the relay device 30, the communication management system 50, and the program providing system 90.

Furthermore, the maintenance system 100 may perform maintenance such as management of the machine number, the manufacturing number, the sales destination, and repair/inspection of at least one of the communication terminal 10, the relay device 30, the communication management system 50, and the program providing system 90, without using the communication network 2.

Note that as other formats of the detachable recording medium, the programs may be provided by being stored in a computer-readable recording medium such as a CD-R (Compact Disc Recordable), a DVD (Digital Versatile Disk), and a Blu-ray disc.

Functional Configuration of Embodiment

Figure 6:
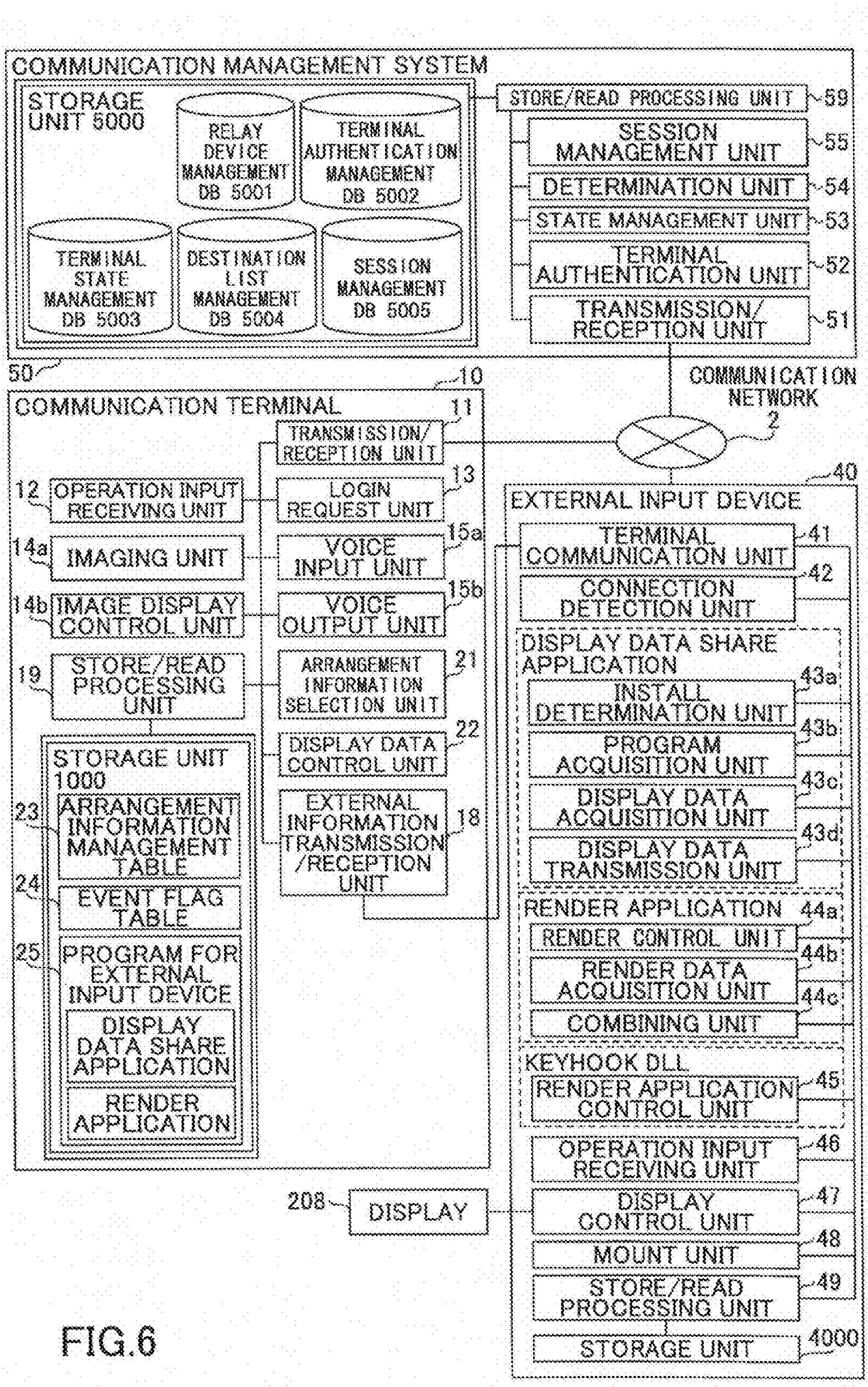
FIG. 6 is a functional block diagram of the communication terminal, the communication management system, and the external input device constituting part of the communication system according to the first embodiment.

Next, a description is given of a functional configuration of the present embodiment. FIG. 6 is a functional block diagram of the communication terminal 10, the communication management system 50, and the external input device 40 constituting part of the communication system 1 according to the present embodiment. In FIG. 6, the communication terminal 10 and the communication management system 50 are data-communicably connected to each other via the communication network 2. Furthermore, the external input device 40 and the communication terminal 10 are connected such that data can be transmitted/received. Note that the program providing system 90, the maintenance system 100, and the relay device 30, which are illustrated in FIG. 2, are omitted from FIG. 6.

Functional Configuration of Communication Terminal

The communication terminal 10 includes a transmission/reception unit 11, an operation input receiving unit 12, a login request unit 13, an imaging unit 14*a*, an image display control unit 14*b*, a voice input unit 15*a*, a voice output unit 15*b*, an external information transmission/reception unit 18, a store/read processing unit 19, an arrangement information selection unit 21, and a display data control unit 22. These units are functions or means that are realized as any one of the configuration elements illustrated in FIG. 4 is operated by instructions from the CPU 201 according to a program stored in the ROM 202.

Furthermore, the communication terminal 10 includes a storage unit 1000 that may include any one of the ROM 102, the RAM 103, and the flash memory 104 illustrated in FIG. 4. The storage unit 1000 stores an arrangement information management table 23, an event flag table 24, and programs for an external input device (display data share application, render application) 25.

Functional Units of Communication Terminal

Next, a detailed description is given of the units of the communication terminal 10. The transmission/reception unit 11 of the communication terminal 10 is realized by the network I/F 111 illustrated in FIG. 4, and performs transmission/reception of various data (information) with another terminal, device, or system, via the communication network 2. The operation input receiving unit 12 is realized by the operation button 108 and the power switch 109 illustrated in FIG. 4, and receives various inputs from the user. For example, when the user turns ON the power switch 109 illustrated in FIG. 4, the operation input receiving unit 12 illustrated in FIG. 6 receives the power ON, and turns ON the power. The login request unit 13 as realized by an instruction from the CPU 101 illustrated in FIG. 4, and is triggered by the receiving of the power ON to automatically send, from the transmission/reception unit 11 to the communication management system 50 via the communication network 2, login request information indicating a login request, and the present IP address of the communication terminal 10*ab*.

The imaging unit 14*a* is realized by the camera 112 and the imaging element I/F 113 illustrated in FIG. 4, and takes an image of a subject and outputs image data obtained by taking the image of the subject. The image display control unit 14*b* is realized by the display I/F 117 illustrated in FIG. 4, and implements control for sending image data to the display 120. The image display control unit 14*b* displays image data taken by the imaging unit 14*a* of the communication terminal 10 that is the self-device and other communication terminals 10, as well as display data displayed and captured at the display 208 of the external input device 40 connected to the communication terminal 10 that is the self-device. The image display control unit 14*b* has a function of controlling the display area of the video data and the display data.

The voice input unit 15*a* is realized by the microphone 114 and the voice input output I/F 116 illustrated in FIG. 4, and outputs voice data relevant to voice signals, by receiving input of a user's voice sound and converting the voice sound into the voice signals. The voice output unit 15*b* is realized by the speaker 115 and the voice input output I/F 116 illustrated in FIG. 4, and converts voice signals relevant to voice data into a voice sound, and outputs the voice sound. The voice input unit 15*a* measures the input level of voice signals, and compares the measured input level with a threshold to determine whether there is a voice signal.

The arrangement information selection unit 21 selects a share flag from the event flag table 24 based on a distribution event of display data reported from the relay device 30, and sets the share flag in the arrangement information management table 23. Accordingly, the arrangement information selection unit 21 instructs the image display control unit 14*b* to display the arrangement information of a screen on the display 120. Details are described below.

The display data control unit 22 is for acquiring display data of the external input device 40, and sends the acquired display data to another communication terminal 10*db* via the relay device 30. The display data is image data obtained by converting an image displayed on the display 208 into to a format such as JPEG (Joint Photographic Experts Group) and Bitmap. In the display data, the render contents may be overwritten (combined) by a render application.

Furthermore, the display data control unit 22 determines the state of the display control flag by referring to the event flag table 24 in response to a distribution event reported from the relay device 30, and sends the display control flag to the external input device 40. Note that the distribution request (distribution start described below) reported from the external input device 40 connected to the self-terminal is also first sent to the relay device 30, and then sent to the self-terminal and another communication terminal as a distribution event from the relay device 30.

Note that the terminal ID and the relay device ID described below of the present embodiment are identification information such as a language, characters, symbols, or various signs, used for uniquely identifying the communication terminal 10 and the relay device 30. Furthermore, the terminal ID and the relay device ID may be identification information obtained by combining at least two elements among a language, characters, symbols, or various signs.

Control of Area of Display 120

FIG. 7A illustrates an example of the event flag table 24. In the event flag table 24, a distribution event sent from the relay device 30, a share flag to which the arrangement information selection unit 21 refers in response to the distribution event, and a display control flag to which the display data control unit 22 refers, are registered in association with each other.

As distribution events, there are a "distribution start event", a "distribution start event from other", a "distribution stop event", and a "distribution stop event from other". The share flag of the former two distribution events is "SHARED" in accordance with a distribution event by which the communication terminal 10 receives the display data, and the share flag of the latter two distribution events is "UNSHARED" in accordance with a distribution event by which the communication terminal 10 does not receive the display data.

Furthermore, the display control flag corresponding to the "distribution start event" is "SHARED", the display control flag corresponding to the "distribution start event from other" is "SHARED_ANOTHER", and the display control flag corresponding to the "distribution start event" and "distribution stop event from other" is "UNSHARED". "SHARED" indicates sharing display data of the self-terminal, "SHARED_ANOTHER" indicates sharing the display data of another terminal, and "UNSHARED" indicates not sharing the display data.

FIG. 7B illustrates an example of the arrangement information management table 23. In the arrangement information management table 23, information for managing the arrangement of the display data is registered. The "arrangement information no." is identification information for identifying a record, and the "arrangement information" includes "VIEW_MULTI" and "SHARED_MULTI" for instructing how to arrange the video data and display data in the display 120. "VIEW_MULTI" means to display only the image data, and "SHARED_MULTI" means to display the image data mixed with display data.

Furthermore, a "share flag" corresponds to the event flag table 24 illustrated in FIG. 7A. By the "share flag", the "arrangement information no." is uniquely defined. When the share flag in the event flag table 24 is "SHARED", the image display control unit 14*b* uses the arrangement information of "SHARED_MULTI" of arrangement information no. 2 to control the display screen to be displayed on the display 120, and when the share flag is "UNSHARED", the image display control unit 14*b* uses the arrangement information of "VIEW_MULTI" of arrangement information no. 1 to control the display screen to be displayed on the display 120.

FIG. 7C illustrates an example of the relationship between the arrangement information and the image data or display data assigned to the areas A21 through A24. FIG. 7D illustrates an example of areas A21 through A24. In the case of arrangement information="VIEW_MULTI", image data 1 is displayed in the area A21 and image data 2 is displayed in the area 22, and image data is displayed in all of the areas A21 through A24. In the case of arrangement information="SHARED_MULTI", display data is displayed in the area A21, image data 1 is displayed in the area A22, and image data 2 is displayed in the area A23.

Functional Configuration of External Input Device

As illustrated in FIG. 6, the external input device 40 includes a terminal communication unit 41, a connection detection unit 42, an install determination unit 43*a*, a program acquisition unit 43*b*, a display data acquisition unit 43*c*, a display data transmission unit 43*d*, a render control unit 44*a*, a render data acquisition unit 44*b*, a combining unit 44*c*, a render application control unit 45, an operation input receiving unit 46, a display control unit 47, a mount unit 48, and a store/read processing unit 49. These units are functions or means that are realized as any one of the configuration elements illustrated in FIG. 5 is operated by instructions from the CPU 201 according to a program stored in the ROM 202. Furthermore, in the external input device 40, an OS (Operating System) of Windows®, etc., is installed, and thus has a function of executing a program when connected with another device.

Functional units of External Input Device

Next, a detailed description is given of the units of the external input device 40. The terminal communication unit 41 of the external input device 40 is realized by the external device I/F 215 illustrated in FIG. 5, and performs transmission/reception of various data (information) from the communication terminal 10. The connection detection unit 42 detects that transmission/reception of data with the communication terminal 10 by the external device I/F 215 has become possible.

The install determination unit 43*a* determines whether the program for an external input device 25 is installed in the external input device 40. When the program for an external input device 25 is not installed, the program acquisition unit 43*b* installs the program for an external input device 25 in the external input device 40 from the storage unit 1000 of the communication terminal 10 mounted by the mount unit 48, via the terminal communication unit 41.

The display data acquisition unit 43*c* takes in (captures) an active area, to be the target of input and operations by the user in the screen of the display 208, to acquire display data. The render control unit 44*a* creates a transparent area of the render application, and receives the rendering of figures, etc., according to the operation contents received by the operation input receiving unit 46. The render data acquisition unit 44*b* takes in the render contents in the area of the render application, and creates render data. The combining unit 44*c* writes (combines) the render data over the display data to create display data in which figures, etc., are written. The display data transmission unit 43*d* sends the display data created by the combining unit 44*c* to the communication terminal 10 via the terminal communication unit 41.

The render application control unit 45 controls the position/size of the area where the render application receives the rendering, to be the same position/size as that of the active area. Note that the position of the render application and the position of the area of the application may be used as having the same meaning.

The operation input receiving unit 46 is realized by a keyboard and a mouse, and receives input according to operations by the user. The display control unit 47 causes the display 208 to display the menu contents relevant to the sharing of the display data and the sharing state, according to the display control flag.

The mount unit 48 mounts the storage unit 1000 of the communication terminal connected to the terminal communication unit 41, in a storage unit 4000. The program acquisition unit 43*b* installs the program for an external input device from the storage unit 4000.

The store/read processing unit 49 stores various data by using the HDD 205 illustrated in FIG. 5 as the substance, and performs a process of reading various data stored in the storage unit 4000.

Note that the install determination unit 43*a*, the program acquisition unit 43*b*, the display data acquisition unit 43*c*, and the display data transmission unit 43*d* are realized as the CPU 201 executes a display data share application, and the render control unit 44*a*, the render data acquisition unit 44*b*, and the combining unit 44*c* are realized as the CPU 201 executes a render application. Furthermore, the render application control unit 45 is realized as the CPU 201 executes keyhook DLL.

Functional Configuration of Communication Management System

The communication management system 50 includes a transmission/reception unit 51, a terminal authentication unit 52, a state management unit 53, a determination unit 54, a session management unit 55, and a store/read processing unit 59. These units are functions or means that are realized as any one of the configuration elements illustrated in FIG. 5 is operated by instructions from the CPU 201 according to a program for the communication management system 50 loaded from a HD 204 into the RAM 203. Furthermore, the communication management system 50 includes a storage unit 5000 that is realized by the HD 204 illustrated in FIG. 5. In the storage unit 5000, DB (5001, 5002, 5003, 5004, 5005) constituted by the tables as described below are constructed.

Relay Device Management Table

FIG. 8 is a conceptual diagram of a relay device management table. In the storage unit 5000, a relay device management DB 5001 is constructed, which is constituted by a relay device management table as illustrated in FIG. 8. In the relay device management table, the operation state of each relay device 30, the reception date that the state information indicating the operation state is received at the communication management system 50, the IP address of the relay device 30, and the maximum data communication speed (Mbps) in the relay device 30, are managed by being associated with each relay device ID of the relay devices 30.

Terminal Authentication Management Table

FIG. 9 is a conceptual diagram of a terminal authentication management table. In the storage unit 5000, a terminal authentication management DB 5002 is constructed, which is constituted by a terminal authentication management table as illustrated in FIG. 9. In the terminal authentication management table, a password for authentication is managed by being associated with each terminal ID of all terminals 10 managed by the communication management system 50.

Terminal State Management Table

FIG. 10 is a conceptual diagram of a terminal state management table. In the storage unit 5000, a terminal state management DB 5003 is constructed, which is constituted by a terminal state management table as illustrated in FIG. 10. In the terminal state management table, the type of terminal, the destination name in a case where the terminal is a destination, the operation state of each terminal, the reception date that the login request information described below is received at the communication management system 50, and the IP address of each terminal, are managed by being associated with each terminal ID of all terminals 10. Note that the terminal ID, the type of terminal, and the destination name are managed by being stored when each communication terminal 10 is registered in the communication management system 50 in order to use the communication system 1 for communication.

Destination List Management Table

FIG. 11 is a conceptual diagram of a destination list management table. In the storage unit 5000, a destination list management DB 5004 is constructed, which is constituted by a destination list management table as illustrated in FIG. 11. In the destination list management table, all of the terminal IDs of the destination terminals registered as candidates of communication partners, are managed by being associated with a terminal ID of a request source terminal requesting to start communication. The candidates of communication partners are updated by being added or deleted, according to an addition or deletion request to the communication management system 50 from an arbitrary request source terminal.

Session Management Table

FIG. 12 is a conceptual diagram of a session management table. In the storage unit 5000, a session management DB 5005 is constructed, which is constituted by a session management table as illustrated in FIG. 12. In the session management table, the relay device ID of the relay device 30 used for relaying the communication data (image data and voice data), the terminal ID of the request source terminal, the terminal ID of the destination terminal, the reception delay time (ms) of receiving the image data at the destination terminal, and the reception date that the delay time information indicating this delay time is sent from a destination terminal and received at the communication management system 50, are managed by being associated with each other.

Note that when communication is performed between two communication terminals 10, the reception date of the delay time information may be managed based on the delay time information that is sent from the request source terminal, and not the destination terminal. However, when communication is performed among three or more communication terminals, the reception date of the delay time information is managed based on the delay time information that is sent from the terminal 10 on the receiving side of image data and voice data.

Functional Configuration of Communication Management System

Next, a detailed description is given of the functional configuration of the communication management system 50. The transmission/reception unit 51 is executed by instructions from the CPU 201 illustrated in FIG. 5 and the network I/F 209 illustrated in FIG. 5, and performs transmission/reception of various data (or information) with other terminals, devices, or systems, via the communication network 2.

The terminal authentication unit 52 is realized by an instruction from the CPU 201 illustrated in FIG. 5, and performs terminal authentication by searching the terminal authentication management table by using, as a search key, the terminal ID and password included in the login request information received via the transmission/reception unit 51, and determines whether the same terminal ID and password are managed in the terminal authentication management table.

The state management unit 53 is realized by an instruction from the CPU 201 illustrated in FIG. 5 and manages the operation state of the request source terminal from which a login request is received, by storing and managing, in the terminal state management table in association with each other, the terminal ID of the request source terminal, the operation state of the request source terminal, the reception date that the login request information is received at the communication management system 50, and the IP address of the request source terminal. Furthermore, the state management unit 53 changes the operation state indicating online to offline in the terminal state management table, based on the state information indicating to turn OFF the power sent from the communication terminal 10.

The determination unit 54 is realized by an instruction from the CPU 201 illustrated in FIG. 5, and determines whether the operation state indicated by the operation state information is "online". Furthermore, when the operation state is determined to be "online", the determination unit 54 determines that the operation state information can be sent to a predetermined communication terminal 10, and when the operation state is determined not to be "online", the determination unit 54 determines that the operation state information cannot be sent to a predetermined communication terminal 10.

The session management unit 55 is realized by an instruction from the CPU 201 illustrated in FIG. 5, and stores and manages, in association with each other in the session management table in the storage unit 5000, the relay device ID of the relay device 30 used for relaying the communication data, the terminal ID of the request source terminal, the terminal ID of the destination terminal, the reception delay time (ms) of receiving the image data at the destination terminal, and the reception date that the delay time information indicating this delay time is sent from a destination terminal and received at the communication management system 50. Furthermore, the session management unit 55 creates a session ID used for establishing a communication session.

The store/read processing unit 59 is executed by an instruction from the CPU 201 illustrated in FIG. 5 and the HDD 205 illustrated in FIG. 5, and performs processes of storing various data in the storage unit 5000 and reading various data stored in the storage unit 5000.

Process or Operation of Embodiment

Figure 13:
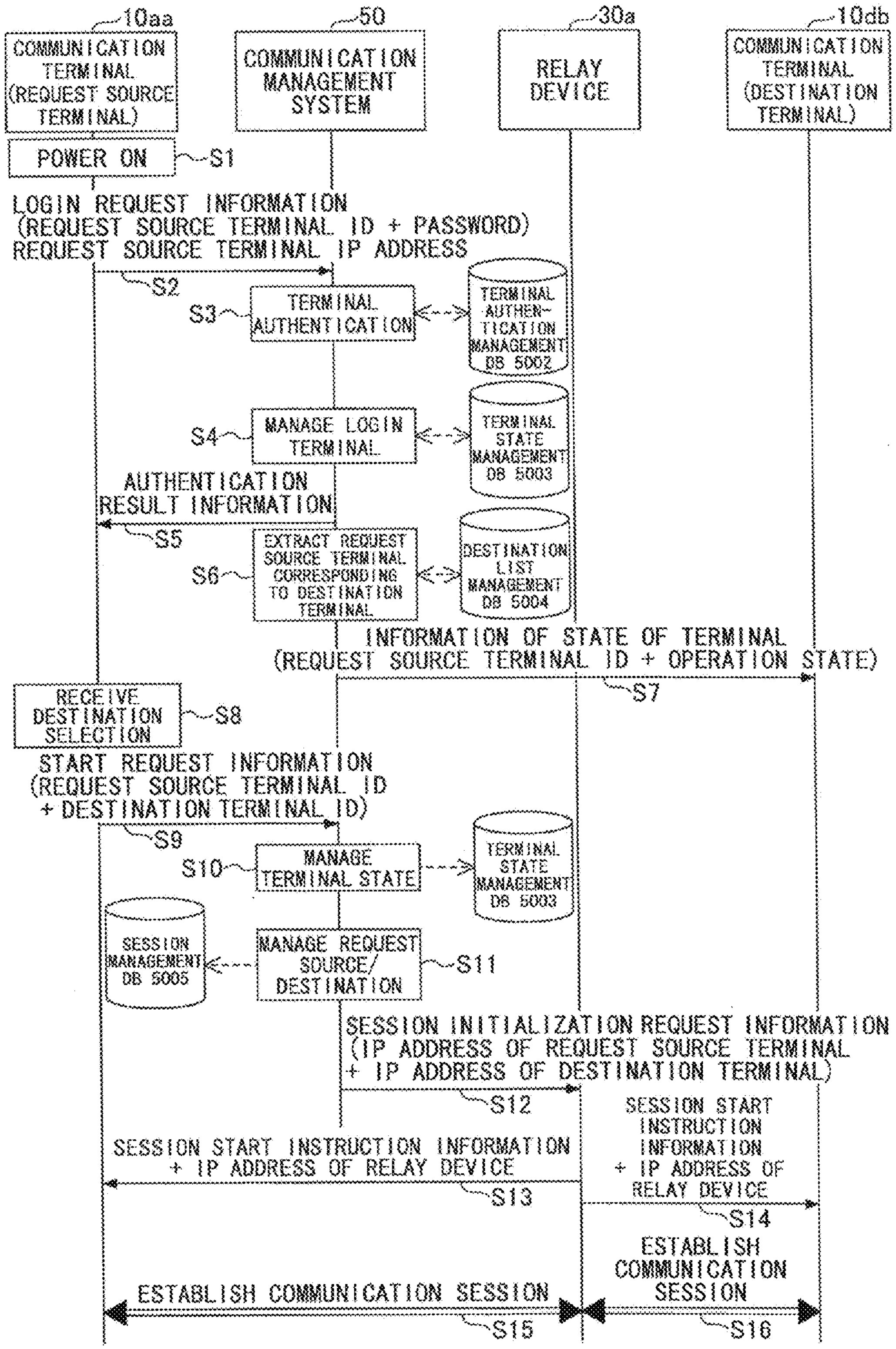
FIG. 13 is a sequence diagram illustrating a process of preparing to start communication between communication terminals, and establishing a session.

Next, with reference to FIG. 13, a description is given of processes or operations of the present embodiment. FIG. 13 is a sequence diagram illustrating a process of preparing to start communication between communication terminals, and establishing a session.

Step S1: First, when a user aa of a request source terminal (communication terminal 10*aa*) turns ON the power switch 109, the operation input receiving unit 12 receives the power ON and turns ON the power of the communication terminal 10.

Step S2: The transmission/reception unit 11 is triggered by the receiving of the power ON, and sends, to the communication management system 50 via the communication network 2, login request information indicating a login request. The login request information includes a terminal ID for identifying the communication terminal 10*aa* that is the request source terminal, and a password. The terminal ID and password are data that is read from the storage unit 1000 via the store/read processing unit 19, and sent to the transmission/reception unit 11. When login request information is sent from the request source terminal (terminal 10*aa*) to the communication management system 50, the communication management system 50 that is the receiving side can recognize the IP address of the terminal 10*aa* that is the sending side. Furthermore, the login request may be triggered by an instruction input by a user, instead of by power ON as described above. Furthermore, the terminal ID and password may be input by a user in the request source terminal Step S3: Next, the terminal authentication unit 52 of the communication management system 50 performs terminal authentication by searching the terminal authentication management table by using, as a search key, the terminal ID and password included in the login request information received via the transmission/reception unit 51, and determines whether the same terminal ID and password are managed in the terminal authentication management table.

Step S4: The terminal authentication unit 52 manages the same terminal ID and the same password, and therefore when it is determined that the login request is from a communication terminal 10 having legitimate usage rights, the state management unit 53 stores, for each record indicated by the terminal ID, the terminal type, and the destination name of the communication terminal 10*aa* in the terminal state management table, the operation state, the reception date that the above login request information is received, and the IP address of the terminal 10*aa*, in association with each other.

Step S5: Then, the transmission/reception unit 51 of the communication management system 50 sends, via the communication network 2, the authentication result information indicating the authentication result obtained by the terminal authentication unit 52, to the request source terminal (communication terminal 10*aa*) from which the login request described above has been received.

Step S6: The store/read processing unit 59 of the communication management system 50 searches the destination list management table based on the terminal ID "01aa" of the request source terminal (communication terminal 10*aa*)

from which the login request has been received, to extract the terminal ID of the other request source terminals in which the terminal ID "01aa" of the request source terminal (communication terminal 10*aa*) is registered as a candidate of the communication partner. Here, as a matter of simplification, subsequent descriptions are given for a case where the terminal ID extracted at step S6 is a terminal ID "01db" of the communication terminal 10*db*.

Step S7: Next, the transmission/reception unit 51 sends, to the terminal 10*db*, the "information of the terminal state" including both the terminal ID "01aa" of the request source terminal (communication terminal 10*aa*) and the operation state information indicating the operation state of the request source terminal (communication terminal 10*aa*). Accordingly, the transmission/reception unit 11 of the communication terminal 10*db* receives the state information of the terminal 10*aa*.

Subsequently, the terminal 10*aa* requests the communication management system 50 to provide the destination terminal ID registered in the destination list management table, and acquires the destination list information (terminal ID, destination name) and the operation state of each terminal. The image display control unit 14*b* of the communication terminal 10*aa* displays, on the display 208, the destination list screen (not illustrated) displaying the destination list.

Step S8: When the user selects, from the destination list, the destination terminal with which communication is to be started, the operation input receiving unit 12 receives a request to start communication with the destination terminal (communication terminal 10*db*).

Step S9: The transmission/reception unit 11 of the request source terminal (communication terminal 10*aa*) sends, to the communication management system 50, start request information, which indicates the desire to start communication, and which includes the terminal ID "01aa" of the request source terminal (communication terminal 10*aa*) and the terminal ID "01db" of the destination terminal (communication terminal 10*db*). Accordingly, the transmission/reception unit 51 of the communication management system 50 receives the above start request information, and also receives the IP address "1.2.1.3" of the request source terminal (communication terminal 10*aa*) that is the transmission source.

Step S10: Then, based on the terminal ID "01aa" of the request source terminal (communication terminal 10*aa*) and the terminal ID "01db" of the destination terminal (communication terminal 10*db*) included in the start request information, the state management unit 53 changes the field part of the operation state of the records including the terminal ID "01aa" and the terminal ID "01db", from "online (communication possible)" to "online (communication in progress)", in the terminal state management table.

Step S11: Next, the session management unit 55 stores and manages, in association with each other, the relay device ID "111a" of the relay device 30*a* to be used, the terminal ID "01aa" of the request source terminal (communication terminal 10*aa*), and the terminal ID "01db" of the destination terminal (communication terminal 10*db*), in the session management table of the storage unit 5000. In this case, for example, the relay device 30*a* having an IP address close to the IP address of the request source terminal (communication terminal 10*aa*) is selected.

Step S12: Next, the transmission/reception unit 51 of the communication management system 50 sends session initialization request information to the relay device 30*a*. Accordingly, the relay device 30*a* receives the session initialization request information. This session initialization request information is an instruction to initialize a communication session of the relay device 30*a*, and includes the IP address "1.2.1.3" of the request source terminal (communication terminal 10*aa*), and the IP address "1.3.2.3" of the destination terminal (communication terminal 10*db*). The IP addresses respectively correspond to the terminal ID of the request source terminal (communication terminal 10*aa*) and the terminal ID of the destination terminal (communication terminal 10*db*) received in step S9, in the terminal state management table.

Step S13: Next, the relay device 30*a* sends session start instruction information to the request source terminal (communication terminal 10*aa*), based on the IP address "1.2.1.3" of the request source terminal (communication terminal 10*aa*) received in step S12. This session start instruction information is an instruction to start a communication session at the request source terminal (communication terminal 10*aa*). Furthermore, at this time, the IP address "1.2.1.2" of the relay device 30*a* is also sent.

Step S14: Similarly, the relay device 30*a* sends session start instruction information to the destination terminal (communication terminal 10*db*), based on the IP address "1.3.2.3" of the destination terminal (communication terminal 10*db*) received at step S12. This session start instruction information is an instruction to start a communication session at the destination terminal (communication terminal 10*db*). Furthermore, at this time, the IP address "1.2.1.2" of the relay device 30*a* is also sent.

Step S15: Accordingly, a first communication session sed1 is established between the request source terminal (communication terminal 10*aa*) and the relay device 30*a*.

Step S16: Furthermore, a second communication session sed2 is established between the destination terminal (communication terminal 10*db*) and the relay device 30*a*.

Figure 15:
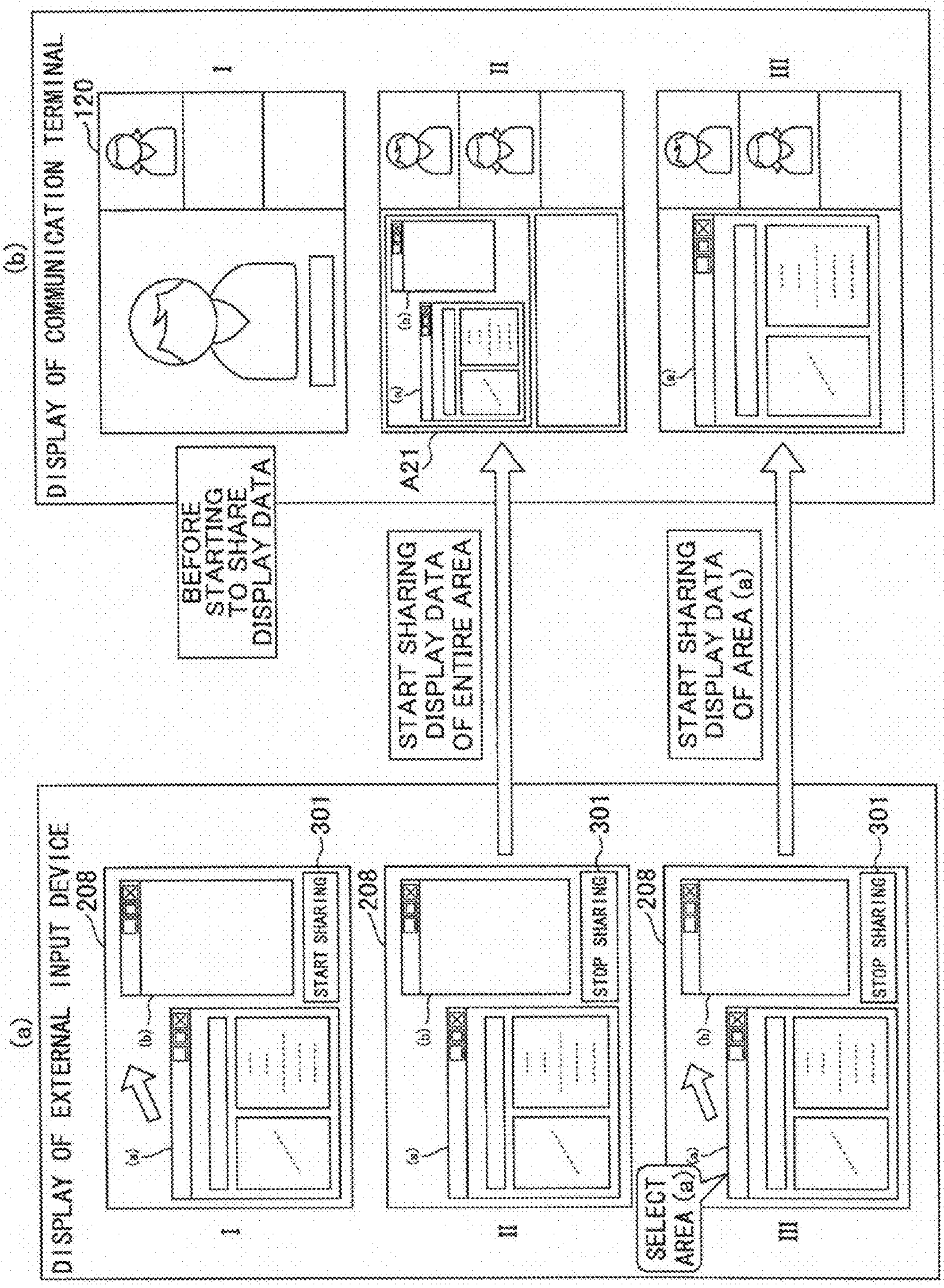
FIG. 15 illustrates an example of a desktop screen displayed on a display connected to the external input device, and an example of a display screen displayed on a display connected to the communication terminal.

Accordingly, communication is started between the request source terminal (communication terminal 10*aa*) and the destination terminal (communication terminal 10*db*), and a display screen (communication screen) as indicated in FIG. 15 (*b*) is displayed on the display 120 of the request source terminal (communication terminal 10*aa*) and the destination terminal (communication terminal 10*db*).

Transmission Operation of Display Data

Figure 14:
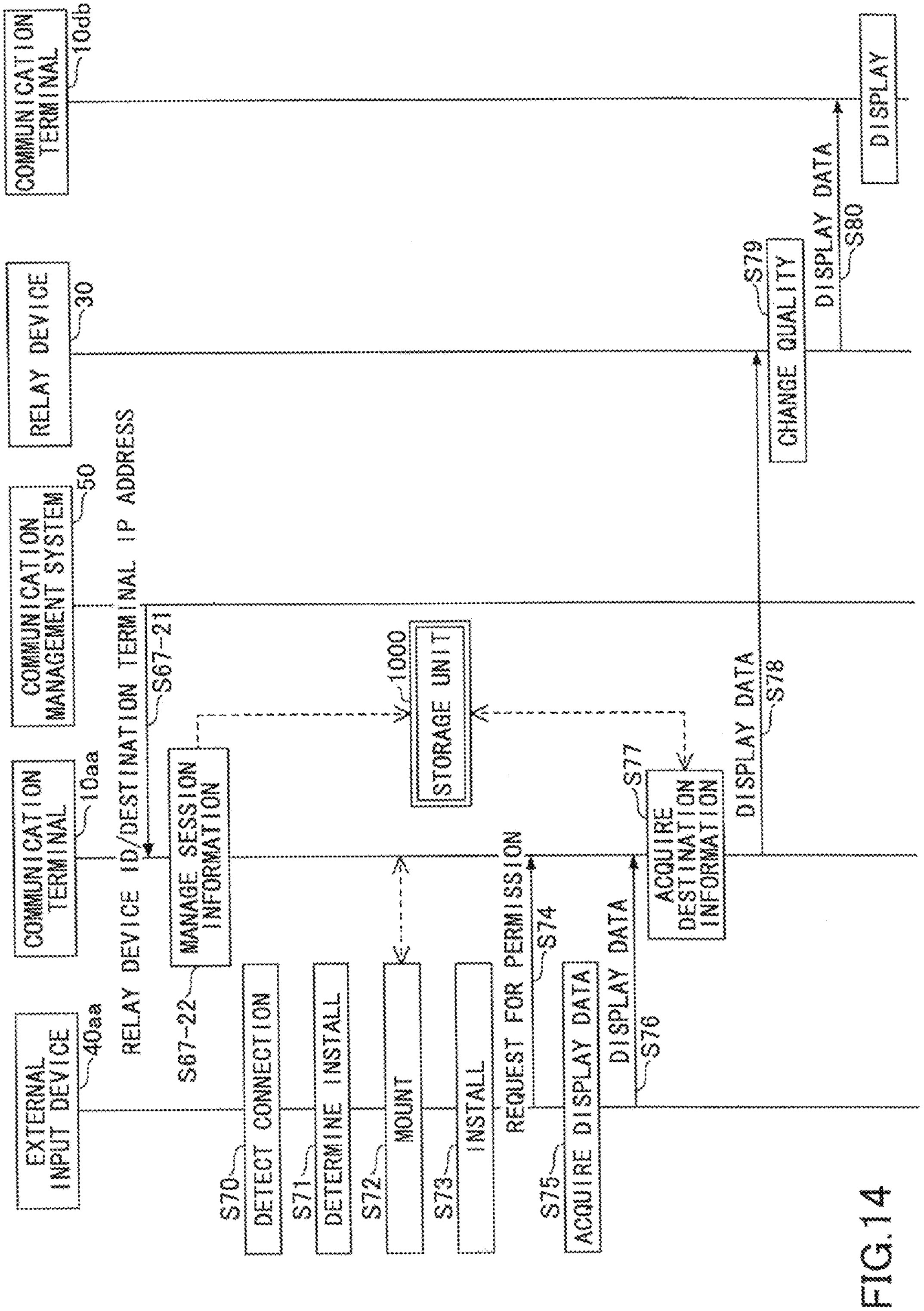
FIG. 14 is a sequence diagram illustrating a process of displaying display data displayed by the external input device, on the communication terminal that is the partner of the conference.

FIG. 14 is a sequence diagram illustrating a process of displaying display data displayed by the external input device 40, on the communication terminal 10 that is the partner of the conference. A description is given of an example of causing the communication terminal 10*db* that is the destination terminal, to display a display screen being displayed by an external input device 40*aa* connected to the communication terminal 10*aa*.

As described above, when the relay device 30 is determined, the relay device ID "111a" and the IP address "1.3.2.4" of the destination terminal 10*db*, which are sent by the communication management system 50 in step S67-21, are received by the transmission/reception unit 11 of the communication terminal 10*aa*, and the received relay device ID "lila" and IP address "1.3.2.4" are stored in the storage unit 1000 by the store/read processing unit (step S67-22).

Furthermore, when the external input device 40*aa* and the communication terminal 10*aa* are connected to each other, the connection detection unit 42 of the external input device 40*aa* detects this connection (step S70). When the connection detection unit 42 detects that the external input device 40*aa* and the communication terminal 10*aa* have been connected to each other, the install determination unit 43*a* determines whether the display data share application and the render application have already been installed (step S71). When it is determined in step S71 that the display data share application and the render application have been installed, the process proceeds to step S74 and onward.

When it is determined in step S71 that the display data share application and the render application have not been installed, the mount unit 48 mounts the storage unit 1000 of the communication terminal 10 in the storage unit 4000 (step S72).

The program acquisition unit 43*b* acquires the display data share application and the render application stored in the mounted storage unit 1000, and installs the acquired applications (step S73).

In step S73, when the display data share application and the render application are installed, the external input device 40*aa* requests the communication terminal 10*aa* to give permission for the display data acquisition unit 43*c* to execute a process (step S74).

When the communication terminal 10*aa* gives, to the external input device 40*aa*, permission for the display data acquisition unit 43*c* to execute a process, the display data acquisition unit 43*c* acquires display data (step S75). Details of step S75 are described below.

Next, the display data transmission unit 43*d* sends, to the communication terminal 10*aa*, the display data acquired by the display data acquisition unit 43*c* (step S76).

When the external information transmission/reception unit 18 of the communication terminal 10*aa* that is the transmission destination receives the display data, the store/read processing unit 19 acquires the relay device ID "111a" and the IP address "1.3.2.4" of the communication terminal 10*db* to be the destination stored in the storage unit 1000 (step S77).

Then, the display data control unit 22 sends, via the transmission/reception unit 11 to the relay device 30 indicated by the relay device ID "111a" acquired in step S77, the display data and the IP address "1.3.2.4" of the communication terminal 10*db* to be the destination (step S78).

In step S78, when the display data sent from the communication terminal 10*aa* is received, the relay device 30 changes the quality of the display data based on the IP address "1.3.2.4" of the communication terminal 10*db* (step S79), and sends the display data to the communication terminal 10*db* (step S80).

When the transmission/reception unit 11 of the communication terminal 10*db* receives the display data sent from the relay device 30, the image display control unit 14*b* displays the display data.

Acquisition of Display Data

A description is given of acquiring the display data in step S75. The user only needs to operate a pointing device (for example, the mouse 212) of the external input device 40, to switch, into an active area, an arbitrary area among the plurality of areas displayed on the display 208 connected to the external input device 40. Furthermore, the display data acquisition unit 43*c* acquires the display data of the active area, and therefore the communication terminal 10 can share an arbitrary area with another communication terminal 10 and display the arbitrary area on the display 120. Note that a pointing device mainly refers to the mouse 212; however, when the display 208 has a touch panel, function for detecting the position of the user's fingertip is the pointing device.

FIG. 15 (*a*) is an example of a desktop screen displayed on the display 208 connected to the external input device 40*aa*, and FIG. 15 (*b*) is an example of a display screen displayed on the display 120 connected to the communication terminal 10*aa*.

A display data share application installed in the external input device 40*aa*, such as the display control unit 47, displays a share setting reception button 301 at the bottom right of the desktop screen according, constantly or according to a predetermined operation by the user. A predetermined operation is, for example, clicking or double-clicking an icon of a program for an external input device, or hovering the mouse over the icon.

FIG. 15 (*a*) I indicates the state before starting to share the display data, and therefore "start sharing" is displayed on the share setting reception button 301. Therefore, as indicated in (b) I, the display 120 only displays the image data of the communication terminal 10*aa* and the communication terminal 10*db*.

When the user clicks the share setting reception button 301 with a pointing device, the display data displayed on the display 208*aa* of the external input device 40*aa* starts to be shared. Specifically, the operation input receiving unit 46 detects an operation of the share setting reception button 301, the display data acquisition unit 43*c* reports this to the communication terminal 10*aa*, and the display data control unit 22 of the communication terminal 10*aa* reports this to the relay device 30. As a distribution event is reported from the relay device 30 to the communication terminal 10*aa*, a share flag is determined, and an "arrangement information no." is determined. Furthermore, when the share flag is determined, the display control flag is also determined, and therefore the display data control unit 22 sends the display control flag to the external input device 40. Subsequently, the display data is first sent from the external input device 40*aa* to the communication terminal 10*aa*, and sent from the communication terminal 10*aa* to the relay device 30, and the display data is distributed from the relay device 30 to the communication terminals 10 including the self-device. The image display control unit 14*b* displays display data and image data based on the "arrangement information no."

The description of the share setting reception button 301 changes according to the received display control flag. That is to say, in a state where the display data displayed on the display 208 of the external input device 40*aa* is shared, "stop sharing" is described on the share setting reception button 301 as indicated in (a) II.

When sharing the display data, if the user has not selected an area with a pointing device, the display data acquisition unit 43*c* acquires the display data of the entire area. Therefore, as indicated in (b) II, the desktop screen of the display 208 of the external input device 40 is displayed on the display 120 as display data in the area A21.

Meanwhile, when the user has selected an area with the pointing device, the selected active area is taken in and display data is created. In (a) III, the area (a) is selected, and therefore as indicated in (b) III, the area (a) that is the active area in the desktop screen is displayed in the area A21 as display data on the display 120.

In (b) III, when the user clicks the share setting reception button 301 with the pointing device, a distribution event is generated, and the display data displayed on the display 208*aa* of the external input device 40*aa* stops being shared with the communication terminal 10*db* (the relay device 30 stops the relaying). Furthermore, "start sharing" is described on the share setting reception button 301.

Note that in the communication system 1, the data that is shared is the display data of the entire area or an area of the external input device 40, when the share setting reception button 301 displaying "start sharing" was clicked last. Therefore, when the user db clicks the share setting reception button 301 displaying "start sharing", even if the user aa does not click the share setting reception button 301 displaying "stop sharing", the sharing of the display data displayed on the display 208 of the external input device 40*aa*, is automatically stopped.

Figure 16:
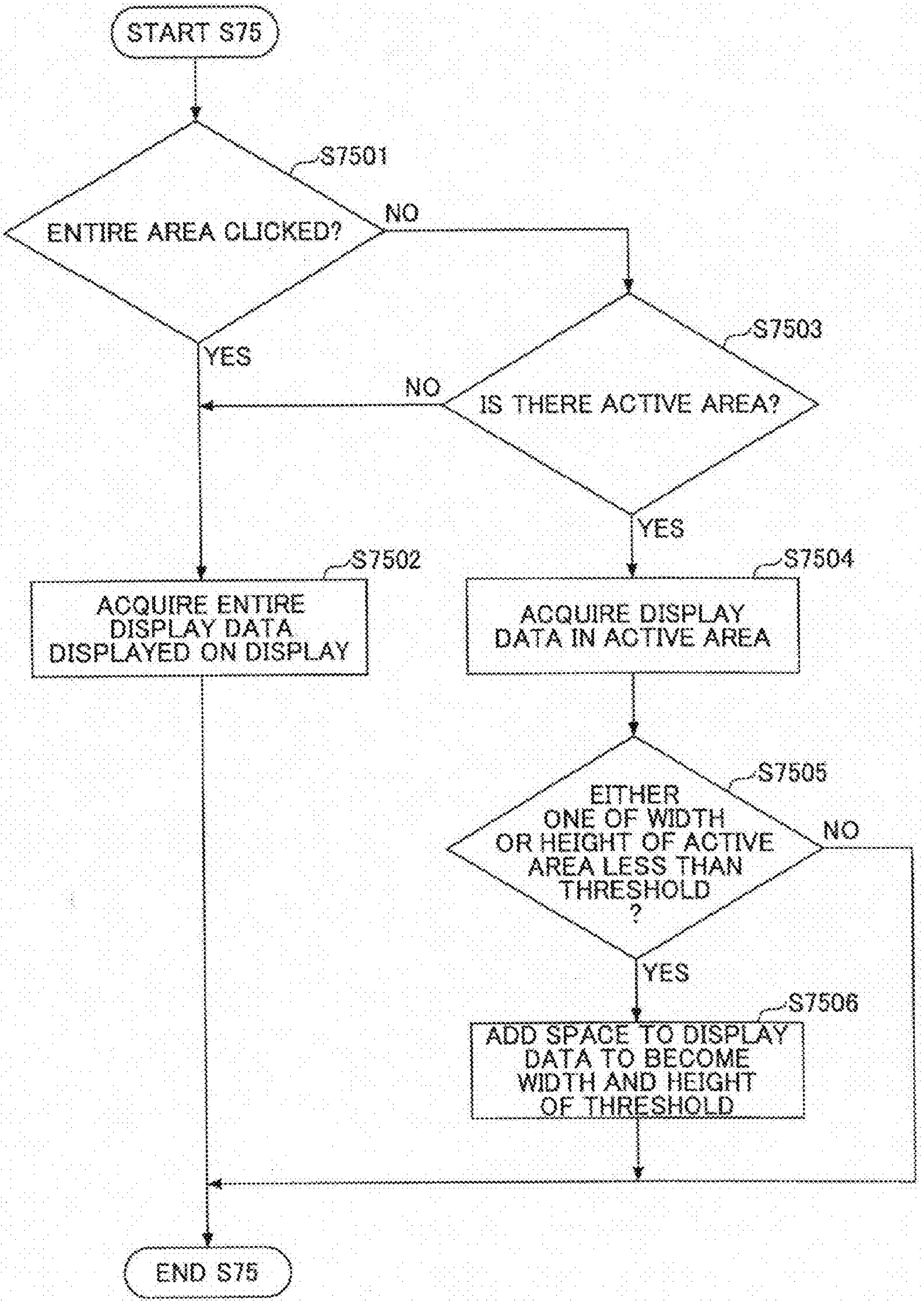
FIG. 16 is an example of a flowchart indicating procedures for acquiring the display data of an entire area or an area by the display data acquisition unit.

FIG. 16 is an example of a flowchart indicating procedures for acquiring the display data of the entire area or an area by the display data acquisition unit 43*c*, in step S75 of FIG. 14. It is assumed that the user aa has already clicked the share setting reception button 301 displaying "start sharing" of FIG. 15.

The operation input receiving unit 46 determines whether a selection of the entire area has been received (step S7501). In order to select the entire area, the user aa clicks a part other than the area of the desktop screen with a pointing device. The OS detects the clicked position. In the present embodiment, the OS operating in the external input device 40 does not only handle an area as one area but also handles the entire area as one area, and the operation of selecting the entire area is performed by clicking a part outside the area of the desktop screen. That is to say, the entire desktop screen is handled as one area. In the OS, there is defined an API (Application Program Interface) making it possible to specify the entire area expressing the entire screen (desktop screen). Thus, when the user selects the entire area with a pointing device, the operation input receiving unit 46 detects the selection of the entire area via the API, and the entire area can be shared as the display data. Note that depending on the OS, the area is referred to as an object (processing target), and the OS manages the position, the attribute values, and whether the area is an operation target.

When a selection of the entire area is received (YES in step S7501), the display data acquisition unit 43*c* acquires the entire desktop screen displayed on the display 208 as display data, and the process ends (step S7502).

When a selection of the entire area is not received (NO in step S7501), the display data acquisition unit 43*c* determines whether there is an active area (step S7503). For this determination, for example, a function of the OS is used. For example, when Windows® API is used, a handle of an active area is acquired, and if the value of the handle is not NULL, it is determined that there is an active area. Note that an active area means an area that is a target of input and operations by the user, and is referred to as an active window in Windows® and in Mac OS.

When there is no active area as the user aa has closed an active area (NO in step S7503), the process proceeds to step S7502, and the entire desktop screen (i.e., the entire area) is acquired as display data.

When there is an active area (YES in step S7503), the display data acquisition unit 43*c* acquires display data of an area that is active, among the display data displayed on the display 203 by the display control unit 47 (step S7504). This area is specified by the handle of the active area acquired in step S7503, and therefore the display data acquisition unit 43*c* can refer to the display data of the area to be acquired.

Next, the display data acquisition unit 43*c* determines whether the width or the height of the acquired area is less than a threshold (step S7503). For example, the threshold of the width is 128 pixels, and the threshold of the height is 36 pixels. This determination is made because display data of a significantly small area does not have much meaningful content, and such a small display data increases the processing load when performing an enlargement process by resolution conversion described below. Furthermore, even if this display data is enlarged by converting the resolution, the enlargement ratio is too large, and therefore the user db most probably cannot recognize the contents. By determining the lower limit of the size of the area to be enlarged, it is possible to reduce the load of the CPU when the communication terminal 10*aa* renders the display data.

When either the width or the height of the area is less than the threshold (YES in step S7505), the display data acquisition unit 43*c* adds black pixels until the area of the present display data has the width×height of the threshold (for example, 128×36 pixels), and ends the process (step S7506). Note that the black pixels are arranged as follows. First, an area having the width×height of the threshold is prepared, and the present display data is arranged such that the top left corner of the threshold area matches the top left corner of the present display data. In the area of having the width×height of the threshold, black pixels are to be added to the parts where the present display data is not arranged. Note that the present display data may be arranged to match any of the other three corners (bottom left, top right, bottom right), or may be arranged to match the center position of the width or height. Furthermore, the pixels to be added are not limited to black pixels; pixels of other colors may be added.

Operation of Render Application

Figure 17:
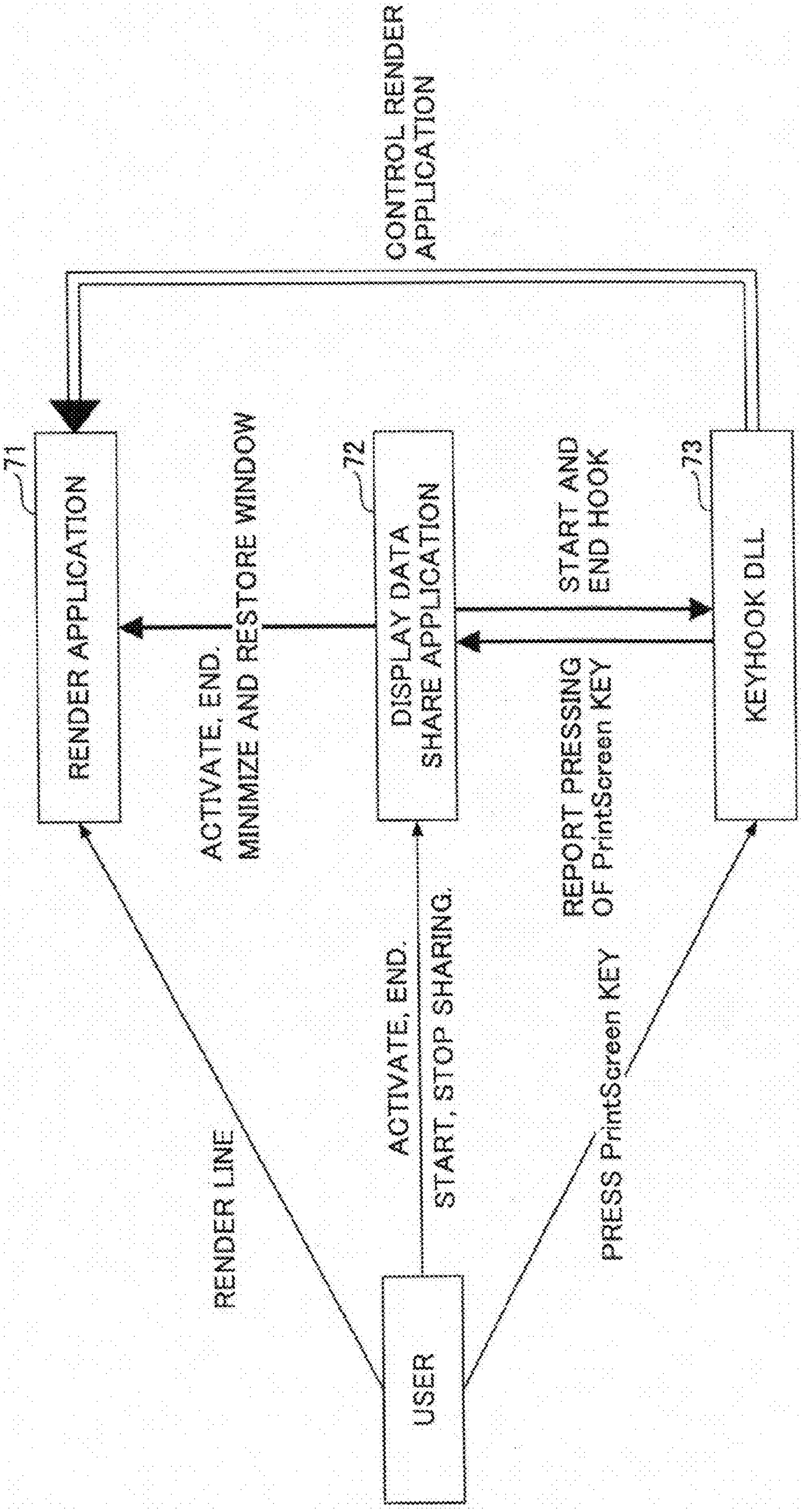
FIG. 17 illustrates an example of operations of the render application.

FIG. 17 illustrates an example of operations of the render application. As described above, in the external input device 40, a render application 71 and a display data share application 72 are installed. Furthermore, keyhook DLL 73 is installed.

(1) First, the user activates the display data share application 72. When the display data share application 72 is to be automatically activated by installing, the activation operation is unnecessary. According to the activation, an icon of the display data share application 72 is registered in the task tray. The keyhook DLL 73 is activated by being triggered by the activation of the display data share application 72. Note that the user may terminate the display data share application 72.

(2) The user who wants to use the render application 71 presses the key to which the activation operation is assigned, in order to activate the render application 71. In FIG. 17, the PrintScreen key is assigned as a key for activating the render application 71.

The reception of the above user operation is implemented by using a method referred to as global hook.

```
HHOOK SetWindowsHookEx(
  int idHook,
  HOOKPROC lpfn,
  HINSTANCE hMod,
  DWORD dwThreadId
);
```

This function is a global hook function provided by Windows®. The first argument idHook is for specifying the hook type, and in a case of hooking an event of the PrintScreen key, the idHook is WH KEYBOARD. The second argument lpfn is for specifying the address of the hook procedure. The third argument hMod is for specifying the handle of the DLL (keyhook DLL) where the hook procedure is implemented. The fourth argument dwThreadId specifies 0 in order to specify all threads.

The keyhook DLL 73 controls the render application upon receiving a user operation. When an arbitrary key (for example, a PrintScreen key) is pressed, a notification is reported to the display data share application 72 that the PrintScreen key has been pressed. The display data share application 72 activates the render application 71. The keyhook DLL 73 detects an active area in the external input device 40, and displays the render application 71 at the same size and position as the detected active area. The keyhook DLL 73 is an example of an area forming unit.

Every time the user presses the PrintScreen key, the keyhook DLL 73 reports this to the display data share application 72, and each time the keyhook DLL 73 displays the render application 71 at the same size and position as the active area.

Furthermore, the global hook may be used other than by pressing the PrintScreen key. For example, every time an area becomes active, the DLL for the hook created in advance reports this to the display data share application 72, and every time the DLL may display the render application at the same size and position as the active area.

Furthermore, when the render application 71 has become active instead of an area, by a user operation using a mouse, the render application 71 may display the render application 71 by a predetermined size. In this case, the keyhook DLL 73 is not needed.

Furthermore, the display data share application 72 may minimize or restore the render application 71. When the display data share application 72 is terminated, the keyhook DLL 73 is also terminated. Furthermore, the render application 71 and the keyhook DLL 73 need not be separate applications, but may be provided as a single application.

Figure 18:
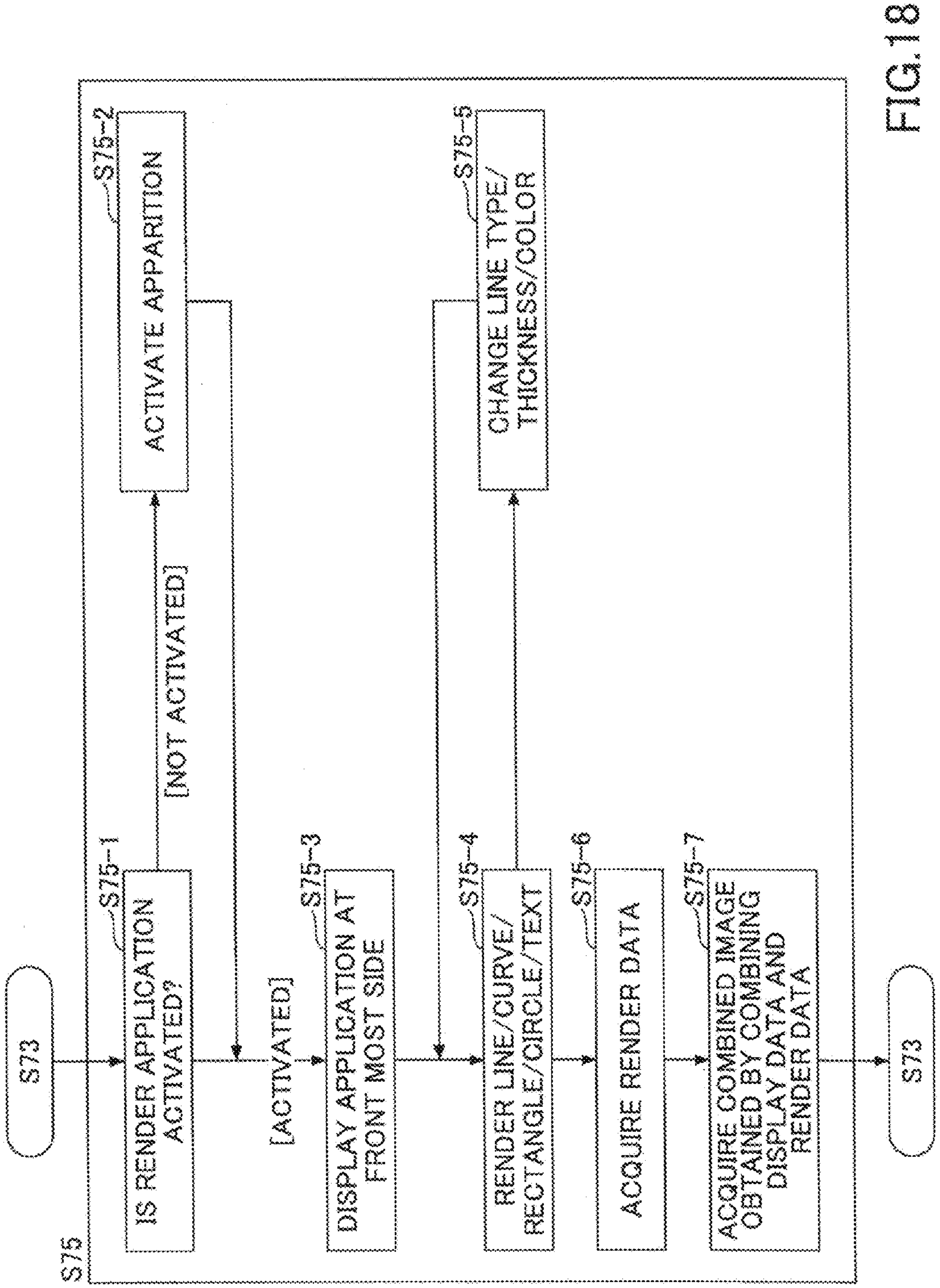
FIG. 18 is an example of a flowchart indicating procedures performed by a keyhook DLL for controlling a render application.

FIG. 18 is an example of a flowchart indicating procedures performed by the keyhook DLL for controlling the render application. The process of FIG. 18 is executed after step S73 of FIG. 14, and is repeatedly executed while the display data share application is being activated. Furthermore, in parallel with the process of FIG. 18, the display data is acquired.

In response to receiving a notification that the PrintScreen key has been pressed, the render application control unit 45 determines whether the render application is activated (step S75-1).

When the render application is not activated (NO in step S75-1), the display data share application activates the render application (step S75-2).

When the render application is activated (YES in step S75-1), the render application control unit 45 (keyhook DLL) displays the render application at the same size and position as an active area (step S75-3). Similar to display data, an active area can be acquired from the OS, and the position and size of the area can also be acquired from the OS. Accordingly, the user can render overlapping lines, curves, rectangles, circles, and text in the area (step S75-4). The render control unit 44*a* of the render application receives the position of the mouse operated by the user, instructions for rendering rectangles and circles, and instructions for rendering text, and displays these contents in the area of the render application.

Furthermore, when the user changes the line type, thickness, color, etc., the render control unit 44*a* receives the change contents (step S75-5).

The render data acquisition unit 44*b* acquires the render contents received by the render application, as render data (step S75-6). The render data is, for example, time series data of coordinates of dots or an assembly of dots. However, the render data may be changed into a format that is easy to combine.

The combining unit 44*c* combines the render data with the display data acquired by the display data acquisition unit 43*c* (step S75-7). The display data and the render data have the same size and position, and therefore by setting the same origin point (for example, the top left corner), the data can be combined without converting the coordinates. The background of the render data is transparent, and therefore the pixels of the display data are to be replaced with non-transparent pixels of the render data. The display data after the combining may remain as bitmap data; however, the display data may be converted into still images or video images compressed by JPEG/MJPEG/H.264/AVC.

Functions of Render Application

Figure 19A:
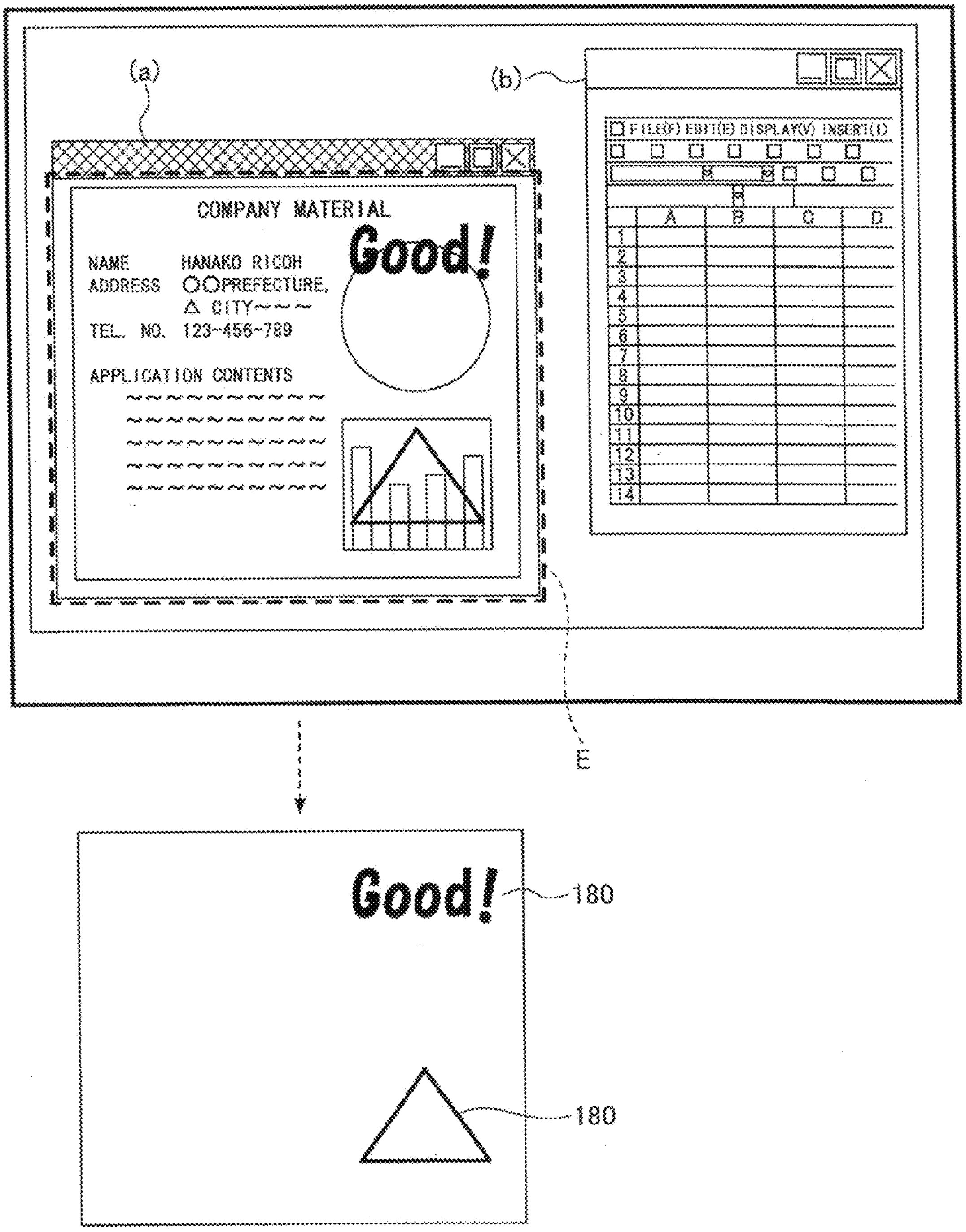
FIGS. 19A and 19B schematically illustrate an example of operations by the render application in the display connected to the external input device.

FIG. 19A schematically illustrates an example of operations by the render application in the display 208 connected to the external input device 40. An area E of the render application created by the render application has a transparent background, and the range surrounded by dashed lines is the area of the render application. Note that the area of the render application is transparent, and therefore for letting the user recognize the area of the render application, visible lines, dashed lines, or marks may be displayed along the outline of the area of the render application.

In FIG. 19A, the user has rendered a triangle and "Good!" in the area of the render application. The render data acquisition unit 44*b* acquires the triangle and "Good!", and creates render data 180.

Figure 19B:
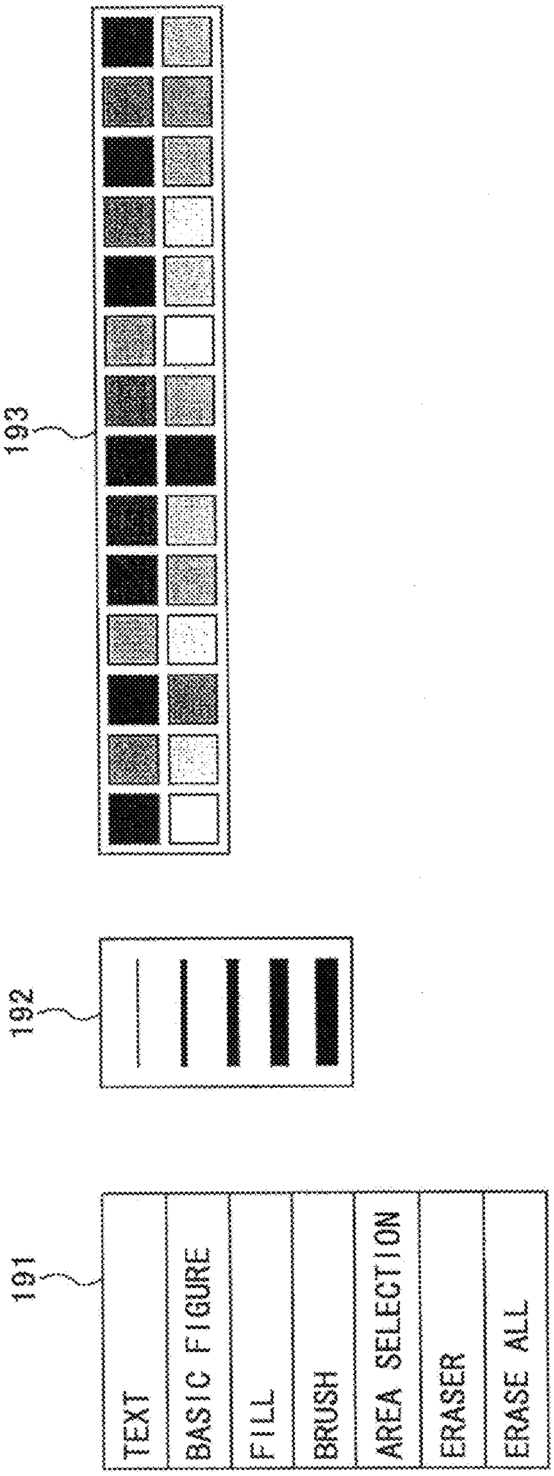

The render application receives the rendering of lines by user operations, similar to paint type applications. FIG. 19B illustrates an example of a toolbar. A toolbar 191 may be displayed according to the right-clicking of the mouse, or may be constantly displayed. Furthermore, a color palette 193 and a line width icon 192 are displayed together with the toolbar 191, and the user can select an arbitrary color and select a line width (thickness) and perform the following rendering.

- When dragged in a state where the mouse is left-clicked, the coordinates of the trajectory of the mouse are taken in in time series.
- When text is selected from the toolbar and the user selects the input mode of the text, characters, numbers, symbols, and alphabetical letters, which correspond to codes input from a keyboard by a user, are rendered by the specified font and size. In this case, the coordinates of dots in the text are taken in.
- When a basic figure is selected from the toolbar, and the user specifies a figure prepared in advance (circle, rectangle, polygon, arrow, symbol, etc.), the figure is rendered. Coordinates of dots in the figure are taken in.
- When fill is selected from the toolbar and a figure is selected, the inside of the figure can be filled.
- When brush is selected from the toolbar and the brush is dragged in a state where the mouse is left-clicked, coordinates of a trajectory rendered by the brush along the trajectory of the mouse are taken in in time series.
- When area selection is selected from the toolbar while a rectangular area is specified with the mouse, the render contents inside the rectangle are selected.
- When eraser is selected from the toolbar and render contents that have already been rendered are specified with the mouse, the render contents at the specified position are erased.
- When erase all is selected from the toolbar, all of the render contents in the area of the render application are erased.

Note that the area of the render application does not need to be completely transparent (100% transmittance), as long as the area on the bottom side is visible. For example, the user may select an arbitrary transmittance, or the area on the bottom side may be colored with a light color that is just visible. If the user can recognize the area of the render application as described above, border lines are unnecessary.

Relationship Between Area and Area of Render Application

Figure 20A:
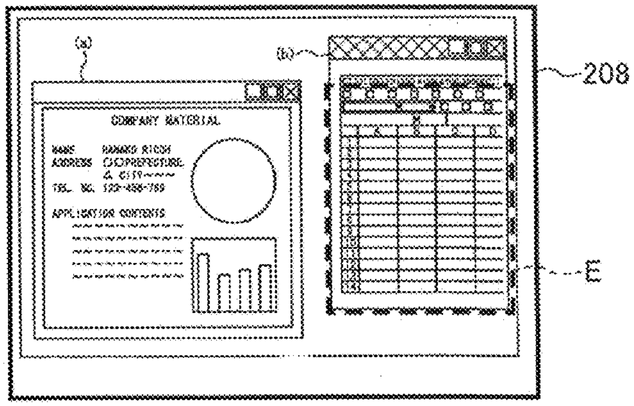
FIGS. 20A through 20D illustrate examples of an area of a render application that is superposed on another area.

FIG. 20A illustrates an example of an area of a render application that is superposed on another area. When the user clicks an area (b) with a mouse and the area (b) becomes an active area, the area of the render application moves to the area (b). The following are examples of the method of moving the area.

The user presses the PrintScreen key, the keyhook DLL detects this, and the keyhook DLL moves the area of the render application.

The keyhook DLL detects that the area has become active, and the keyhook DLL moves the area of the render application.

The user activates the render application, and the render application moves to the active area.

As described above, even if the external input device 40 according to the present embodiment has a plurality of areas of various sizes, the area of the render application can be constantly superposed and displayed on an active area, at the same position and size as the active area.

Note that in an area (a) before moving, the contents rendered by the user are stored in the HD 204 as a file. Therefore, the user can open the render contents afterwards. Furthermore, when saving the render contents as a file, the file is preferably associated with identification information of the area (for example, a handle of the area). Accordingly, when the user activates the area (a) again, the render application can read the file and display (reproduce) the contents.

Figure 20B:
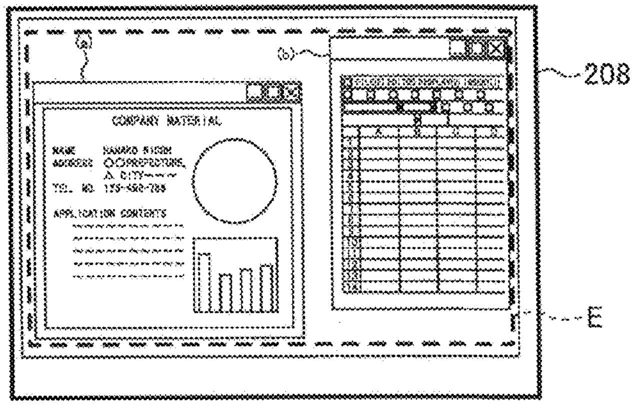

FIG. 20B illustrates an example of an area of a render application that is superposed on the entire area. When the user does not select an active area, or when the user selects the entire area, the area of the render application is enlarged to the entire area. The method of enlarging the area is the same as moving the area to an active area. When the entire area is selected, the area of the render application is superposed on the entire area, and therefore the same area as the display data automatically becomes the area of the render application.

Figure 20C:
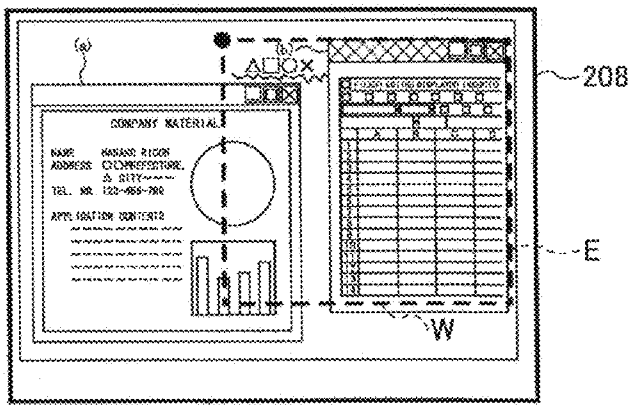

FIG. 20C illustrates an example of an area of a render application that is larger than the active area. When the user wants to render contents relevant to the display contents of the active area, but does not want to render the contents in the active area, the user can enlarge or move the area of the render application. Then, the user can render characters in a part of the area of the render application that does not overlap the active area. As described above, the user can change the area of the render application to have a different size/position from the size/position of the active area, and can acquire the contents rendered in the area of the render application that has been changed.

Note that in this case, when the display data and the area of the render application have different sizes, the combining becomes difficult. Thus, the display data acquisition unit 43*c* and the render data acquisition unit 44*b* respectively set workspaces. The display data acquisition unit 43*c* acquires the area of the render application from the render application, and sets the minimum rectangular area including both the area of the render application and the active area, as the workspace. In the example of FIG. 20C, the rectangular area in which the top left vertex of the area of the render application and the bottom right vertex of the area (b) are opposing corners, is the workspace. That is to say, an area of the render application E and the workspace W are equal to each other. The render data acquisition unit 44*b* also sets a workspace in a similar manner.

Figure 20D:
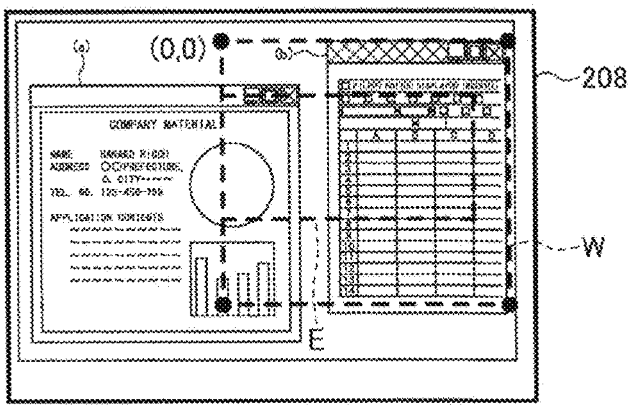

FIG. 20D illustrates another example in which the active area and the area of the render application have different sizes. As illustrated in FIG. 20C, the user may expand the area of the render application, or the keyhook DLL may create, in advance, an area of the render application of a different position/size than the position/size of the active area. For example, a slightly larger area of the render application may be created. In this case, the render data acquisition unit 44*b* may ignore the render contents outside the active area. When the render contents outside the active area are ignored, the render data acquisition unit 44*b* may acquire only the part where the area of the render application and the active area overlap each other, or the combining unit 44*c* may combine only the overlapping parts of the render data 180 and the display data.

Meanwhile, areas may be handled in a similar manner to that of FIG. 20C. When the areas are handled in a similar manner to that of FIG. 20C, the display data acquisition unit 43*c* and the render data acquisition unit 44*b* similarly set the minimum rectangular area including both the area of the render application and the active area, as the workspace.

With respect to a coordinate system in which the top left corner of the workspace W is the origin point, the render data acquisition unit 44*b* acquires render data 180, and the display data acquisition unit 43*c* acquires the display data. Therefore, the workspace is larger than the area of the render application, and the workspace is larger than the active area. The display data created by combining the render data 180 and the display data has the size of the workspace. Thus, even when the active area and the area of the render application have different sizes, it is possible to combine only the display data in the active area with only the render data 180 in the area of the render application.

As described above, with respect to an active area of an arbitrary position/size, it is possible to flexibly create an area of the render application, and combine the display data of the active area and the render data 180.

Figure 21:
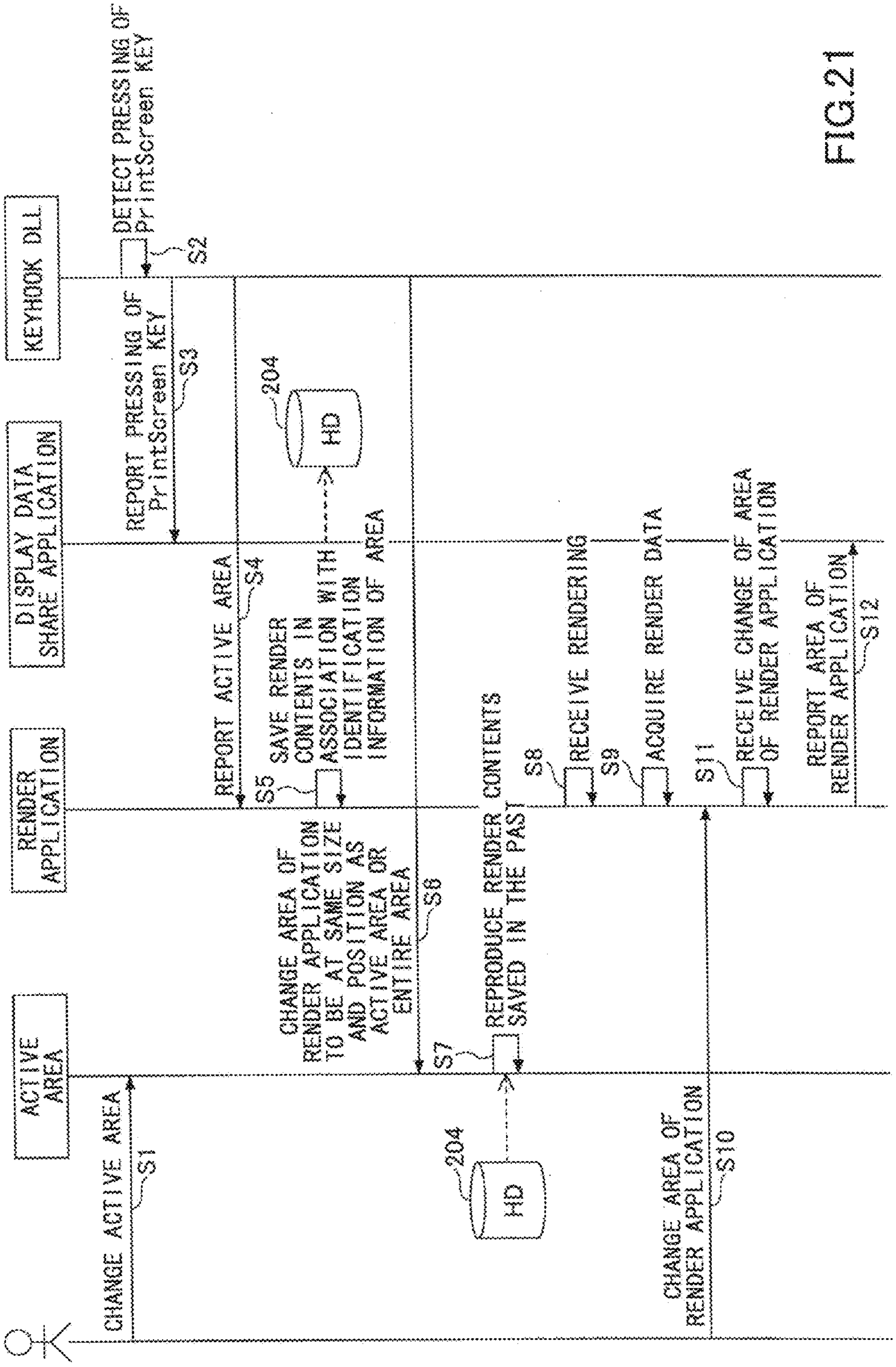
FIG. 21 is an example of a sequence diagram illustrating operation procedures of the render application.

FIG. 21 is an example of a sequence diagram illustrating operation procedures of the render application.

Step S1: The user changes an area created by an arbitrary application, which is desired to be shared in the TV conference, to an active area. There may be cases where the entire area is selected, instead of selecting an active area.

Step S2: When the user presses, for example, the PrintScreen key, the keyhook DLL detects this.

Step S3: The keyhook DLL reports that the PrintScreen key has been pressed, to the display data share application. Accordingly, when the render application is not activated, the display data share application activates the render application.

Step S4: The keyhook DLL reports the active area to the render application. As described above, when the pressing of the PrintScreen key is deemed as the activation of the render application, the render application holds the width of the area as an attribute, and therefore the keyhook DLL is unnecessary.

Step S5: The render application compares the active area that has been reported most recently with the present active area (for example, by comparing the handles), and when the render application determines that the active area has changed, the render application saves the render contents in association with the identification information (for example, the handle) of the area.

Step S6: Furthermore, the keyhook DLL changes the area of the render application to be she same position/size as the active area or the entire area. Accordingly, the area of the render application is generated so as to be superposed on the active area that has been changed by the user.

Step S7: The render application reproduces the render contents saved in association with the identification information of the area that has presently become active.

Step S8: The render application receives the rendering.

Step S9: Furthermore, the render application periodically acquires the received render contents, and creates the render data 180.

Step S10: The user manually changes the area of the render application.

Step S11: The render application receives the change of the area of the render application, and reads the changed position/size from the attribute values.

Step S12: The render application reports the changed area of the render application to the display data share application. Accordingly, the display data share application and the render application can set the workspace for acquiring the display data or the render data 180.

As described above, the communication system according to the present embodiment can flexibly form an area of the render application with respect to an active area having an arbitrary position/size, and combine the render data 180 with the display data.

Second Embodiment

In the present embodiment, a description is given of the communication system 1, in which the render data 180 can be combined with not only the display data, but also with the image data taken by a camera of the communication terminal 10*aa*.

Figure 22:
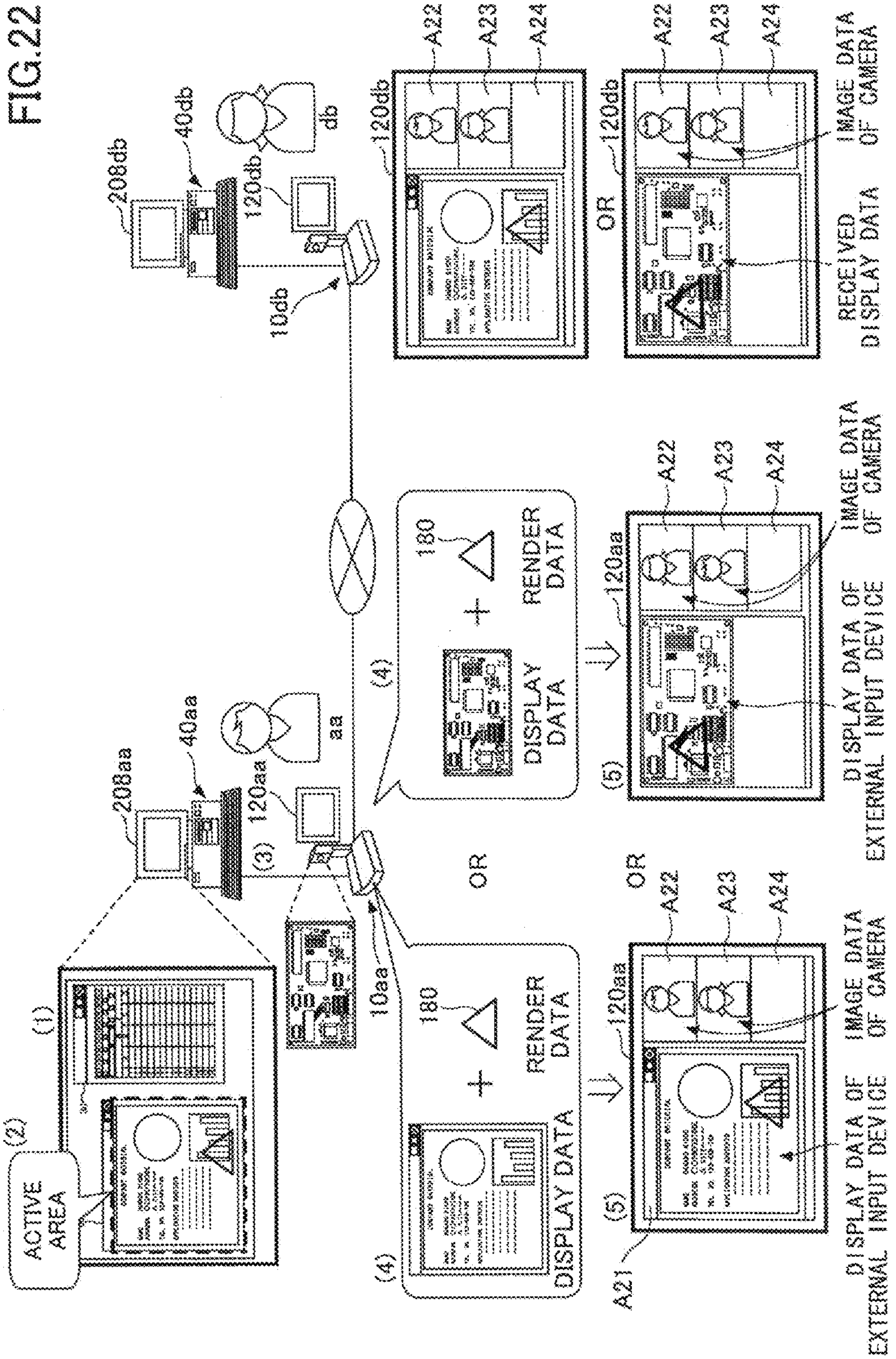
FIG. 22 schematically illustrates an example of an outline of operations by the communication system according to a second embodiment.

FIG. 22 schematically illustrates an example of an outline of operations by the communication system 1 according to the present embodiment. The overall configuration is the same as that of the first embodiment, and therefore the key parts of the present embodiment are mainly described.

(1) A user aa operates the external input device 40*aa* and displays, on a display 208*aa*, an area a and an area b.

(2) The user aa can activate a render application. The area of the render application is set as follows.

- When the display data is shared, the area of the render application is arranged at the same size and position as the active area, similar to the first embodiment.
- When the display data is not shared, the area of the render application is arranged, for example, at the center of the screen and by the same size as the entire area.

(3) When the display data is shared, the external input device 40*aa* takes in the display data of the active area, and sends the display data to the communication terminal 10*aa*. Furthermore, regardless of whether the display data is shared, the external input device 40*aa* takes in the area of the render application, and sends the render data 180 to the communication terminal 10*aa*.

(4) When the display data is shared, the communication terminal 10*aa* writes the render data 180 over the display data and sends the data to the communication terminal 10*db*. When the display data is not shared, the communication terminal 10*aa* writes the render data 180 over the image data and sends the data to the communication terminal 10*db*. That is to say, in the present embodiment, the communication terminal 10 performs the combining process.

(5) When the display data is shared, the communication terminal 10*aa* displays the display data in an area A21, displays the image data taken by the camera of the communication terminal 10*aa* in an area A23, and displays the image data taken by the camera of the communication terminal 10*db* in an area A22. When the display data is not shared, the image data combined with the render data 180 is displayed in the area A21, and the image data taken by the camera of the communication terminal 10*db* is displayed in the area A22.

As described above, the external input device 40*aa* according to the present embodiment can write the render data 180 not only over the display data, but also over the image data taken by a camera. For example, in an object having a complex structure such as a print-circuit board taken by the camera of the communication terminal, it is possible to specify a portion to which attention is to be attracted by using various lines, etc., from the external input device.

Figure 23:
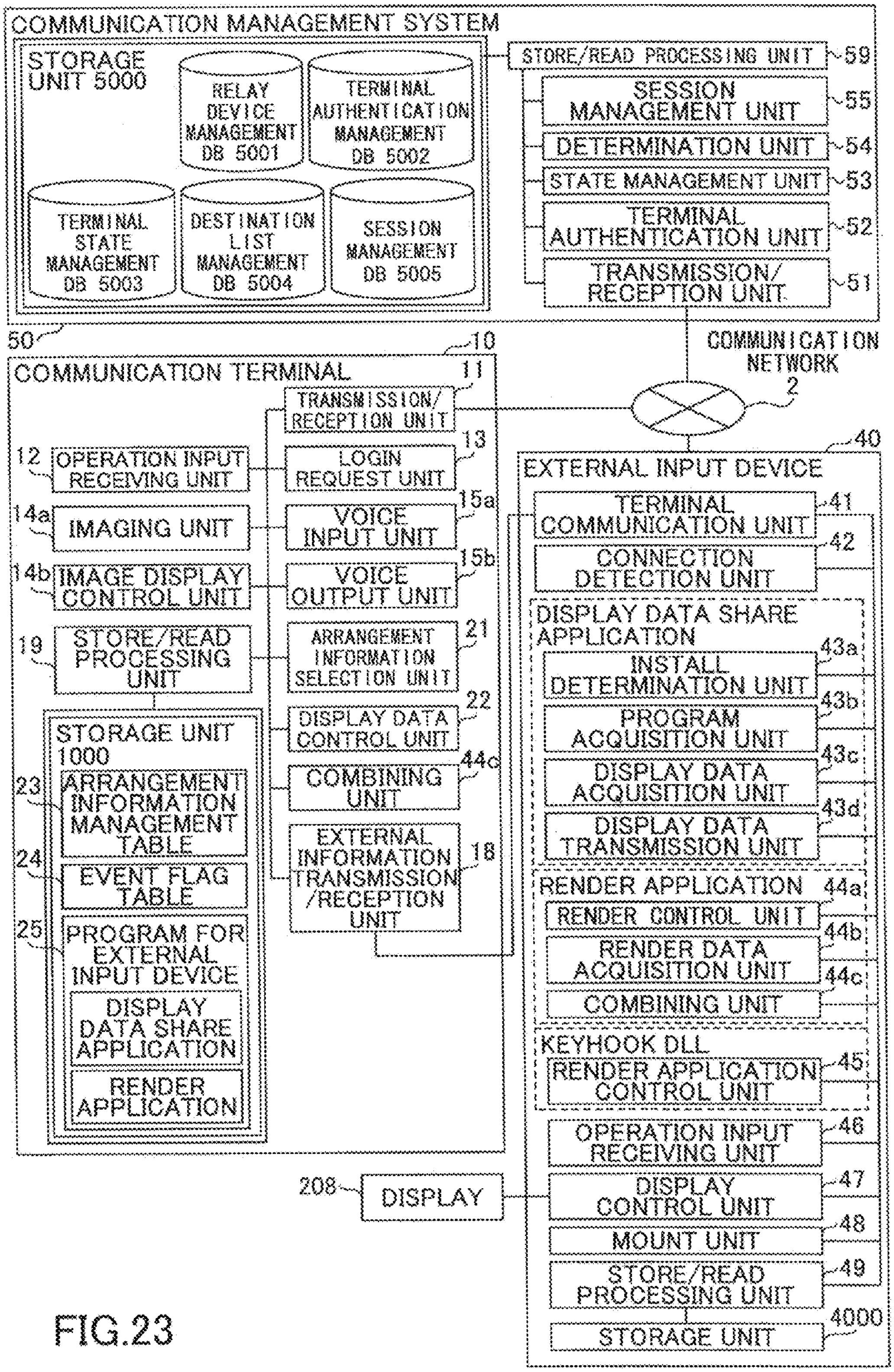
FIG. 23 is a functional block diagram of the communication terminal, the communication management system, and the external input device, constituting part of the communication system according to the second embodiment.

FIG. 23 is a functional block diagram of the communication terminal 10, the communication management system 50, and the external input device 40, constituting part of the communication system 1 according to the present embodiment. In the present embodiment, the communication terminal 10 includes the combining unit 44*c*. The combining unit 44*c* of the communication terminal 10 combines the render data 180 with the display data or the image data taken by the imaging unit 14*a*, depending on whether the share flag of the arrangement information management table is indicating "SHARED".

FIG. 24 illustrates an example of a saving format of the render data 180. As the "line type", there is new, continued, erase, and erase all. New indicates a new line to which no other lines are connected, and continued indicates a line connected to a previous line. Erase indicates that the line has been erased. Erase all indicates that all lines in the area of the render application have been erased. In the example of line type 3 in FIG. 24, the operation is set as line number 7, and a start line number 5 and an end line number 6 are specified as the erased line numbers. In the example of line type 4 in FIG. 24, the operation is set as line number 8, and a start line number 5 and an end line number 6 are specified as the erased line numbers.

As the "line number", when starting to share the display data, the number of the line that is rendered first is set as line number one, and thereafter, serial numbers that are incremented by one are assigned to the lines. The "X absolute coordinate" and the "Y absolute coordinate" are XY coordinates in the area of the render application, and the top left vertex of the area of the render application is set as the origin point (0, 0) and the bottom right vertex is set as (Xmax, Ymax). The unit is in pixels.

The "X relative coordinate" and the "Y relative coordinate" are relative coordinates with respect to the screen resolution of the display 208*c* of the external input device, and the bottom right vertex of the display 208 is specified as (1000, 1000). "Pen type" expresses the style of the line to be rendered, such as brush, pen, and marker. "Pen width" expresses the thickness of the line. "Color" expresses the color of the pen. The render data 180 as described above is sent from the external input device 40 to the communication terminal 10.

Figure 25A:
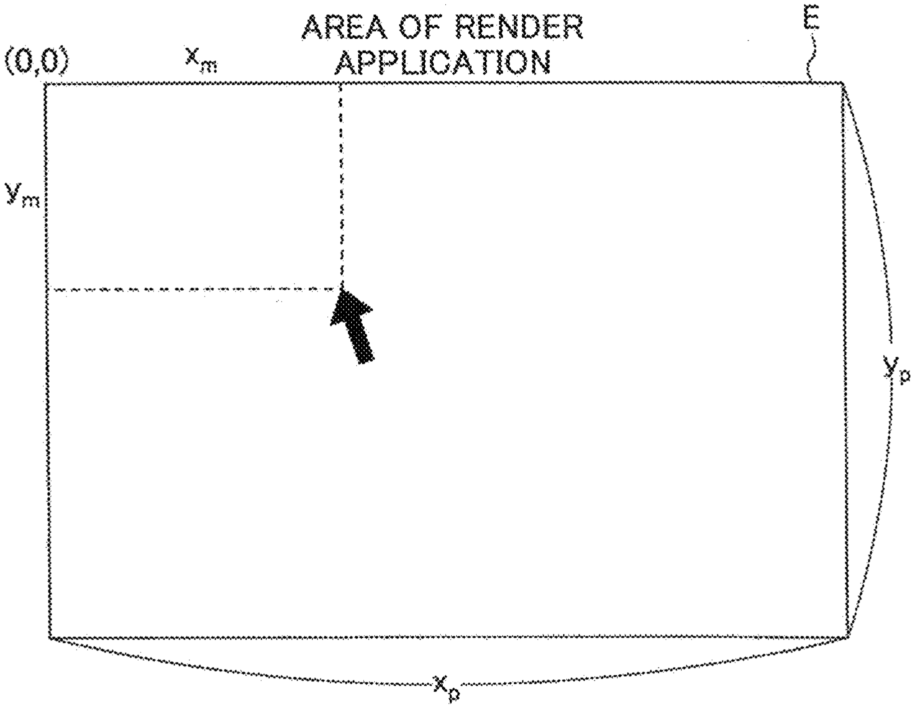
FIGS. 25A and 25B are for describing an example of combining the render data with the image data.
Figure 25B:
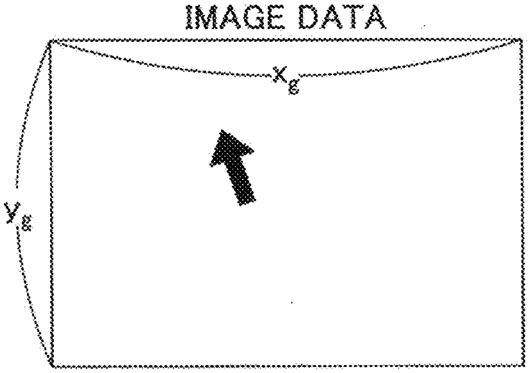

FIGS. 25A and 25B are for describing an example of combining the render data 180 with the image data. FIG. 25A indicates the resolution of the area of the render application, and FIG. 25B indicates the resolution of image data of a camera. The keyhook DLL according to the present embodiment creates an area of the render application similar to the first embodiment; however, when the area of the render application is not combined with the display data, the area of the render application does not need to be of the same position/size as the active area. For example, the area of the render application having the same resolution as the resolution of the camera, may be created at the center of the display 208, or the entire area may be the area of the render application. Furthermore, the display data does not need to be visible, and therefore the area of the render application does not need to be transparent.

When the combining unit 44*c* combines the render data 180 with the image data, the combining unit 44*c* combines the render data 180 with the image data such that the entire area of the render application matches the entire image data.

Assuming that the top left vertex of the area of the render application is the origin point (0, 0), the resolution of the area of the render application is xp, yp, and the resolution of the image data is xg, yg, the position of the mouse coordinates (xm, ym) in the image data (xm', ym') can be calculated as follows.

$$xm' = xg \times (xm/xp)$$

$$ym' = yg \times (ym/yp)$$

The mouse position is preferably constantly displayed in the image data of the camera, and therefore the render data acquisition unit 44*b* sends the mouse coordinates (xm, ym) to the communication terminal 10, separately from the render data 180. The combining unit 44*c* of the communication terminal 10 displays the image data of the mouse pointer stored in advance, at (xm', ym'). Accordingly, the position of the mouse can be displayed in the image data in the display 120. The image data includes a substrate, etc. taken by the camera, and therefore the user can determine the position of the substrate being indicated by the mouse.

When combining the image data with the render data 180, as described with reference to FIG. 24, the render data 180 includes a "X absolute coordinate" and a "Y absolute coordinate", and therefore the render data 180 can be converted to the coordinate system of the image data as follows.

$$X \text{ coordinate after conversion} = xg \times (X \text{ absolute coordinate}/xp)$$

$$Y \text{ coordinate after conversion} = yg \times (Y \text{ absolute coordinate}/yp)$$

The combining unit 44*c* performs the combining by writing the render data 180 converted as described above, over the image data.

Figure 26:
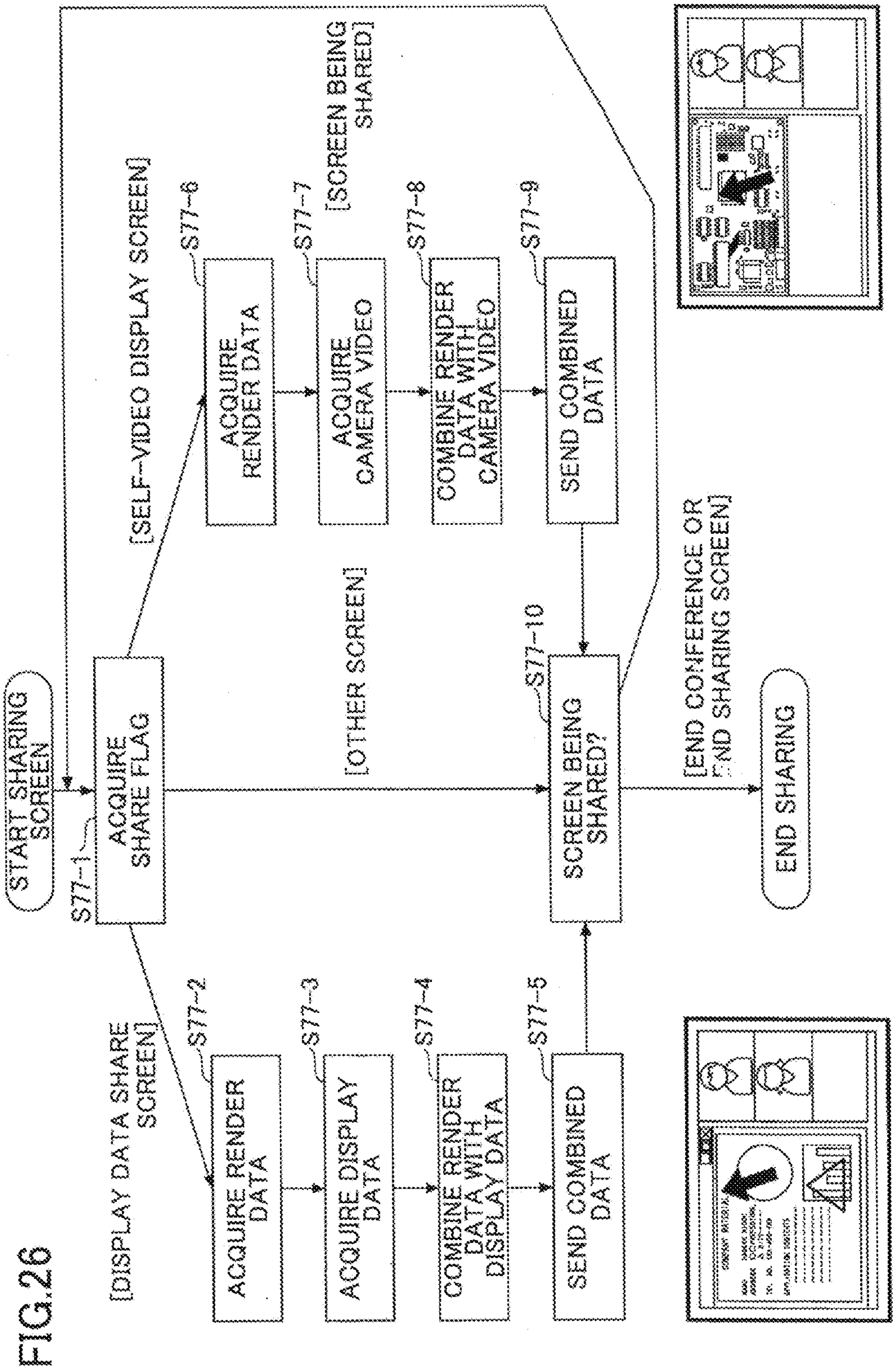
FIG. 26 is an example of a flowchart indicating operation procedures by the communication terminal.

FIG. 26 is an example of a flowchart indicating operation procedures by the communication terminal 10. FIG. 26 is executed after step S77 of FIG. 14.

First, in order to determine whether to combine the render data 180 with the image data of the camera, or with the display data, the combining unit 44*c* acquires the share flag of the arrangement information management table 23 (step S77-1). When the share flag is indicating "UNSHARED", the combining unit 44*c* combines the render data 180 with the image data, and when the share flag is indicating "SHARED", the combining unit 44*c* combines the render data 180 with the display data of the external input device 40. Furthermore, it may be possible to select either to share with the image data or the display data, from menus of the display data share application of the external input device and buttons and menus of the communication terminal. In this case, the share flag is not acquired, and the flow is branched according to the setting state.

When the share flag is indicating "SHARED", the external information transmission/reception unit 18 of the communication terminal 10 acquires the render data 180 sent from the external input device 40 (step S77-2). While the render data 180 is shared, the entire render data 180 is stored.

Next, the external information transmission/reception unit 18 of the communication terminal 10 acquires the display data sent from the external input device 40 (step S77-3). The display data may be bitmap data or compressed data such as JPEG.

The combining unit 44*c* combines the render data 180 acquired at step S77-2 with the display data acquired at step S77-3 (step S77-4). The render data 180 and the display data have the same size, and therefore the coordinate system of the render data 180 when combining the data is to be absolute coordinates. Furthermore, when the display data and the render data 180 have different sizes, the relative coordinate system may be used.

The transmission/reception unit 11 of the communication terminal 10 sends the display data combined with the render data 180, to the relay device 30 (step S77-5).

Meanwhile, when the share flag is indicating "UNSHARED", the external information transmission/reception unit 18 of the communication terminal 10 acquires the render data 180 sent from the external input device 40 (step S77-6). While the render data 180 is shared, the entire render data 180 is stored.

Next, the imaging unit 14*a* acquires the image data taken by the camera (step S77-7). The display data may be bitmap data or compressed data such as JPEG.

The combining unit 44*c* combines the render data 180 acquired at step S77-6 with the image data acquired at step S77-7 (step S77-8). When the image data and the render data 180 have different sizes, the relative coordinate system of the render data 180 is used.

The transmission/reception unit 11 of the communication terminal 10 sends the image data combined with the render data 180 to the relay device (step S77-9).

The combining unit 44*c* determines whether the sharing of the display data or the image data has ended (step S77-10). While the data is being shared, the process loops to step S77-1. When the sharing has ended, the combining is ended.

As described above, the communication system according to the present embodiment can determine which one of the display data or the image data is being shared, and switch the data with which the render data 180 is to be combined accordingly. Furthermore, the render data 180 rendered by the external input device can be combined with an image taken by a camera.

Third Embodiment

As described in the first and second embodiments, there are cases where the render application displays the background of the area E to be transparent, so that the user can visually see the display area of the area or the entire area. When the area E of the render application is transparent, there may be cases where it is difficult for the user to recognize whether contents can be rendered or where to render the contents. Therefore, in the present embodiment, a description is given of the external input device 40 that displays a visible frame line indicating the area of the render application, in order to let the user recognize the presence of the area E of the render application.

Display Example of Frame Line

Figure 27A:
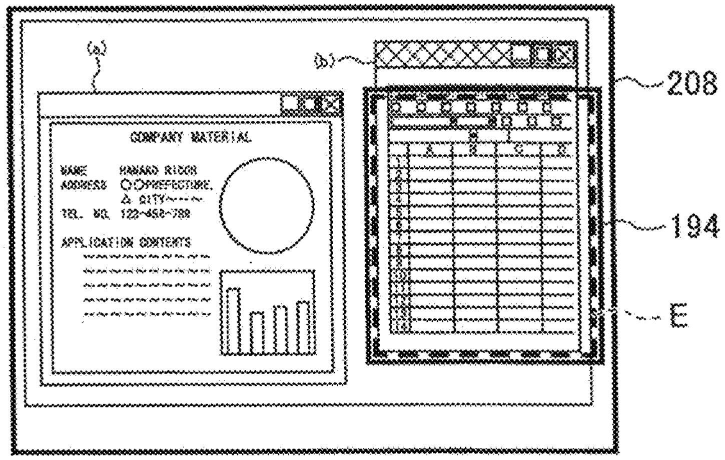
FIGS. 27A through 27C illustrate display examples of render applications in the display connected to the external input device.
Figure 27B:
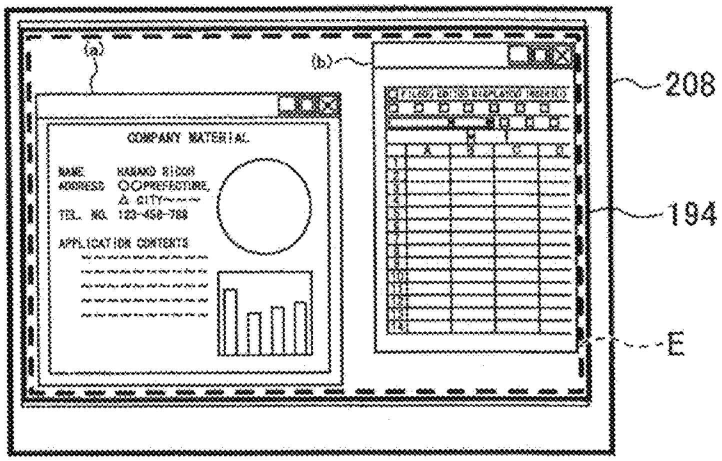
Figure 27C:
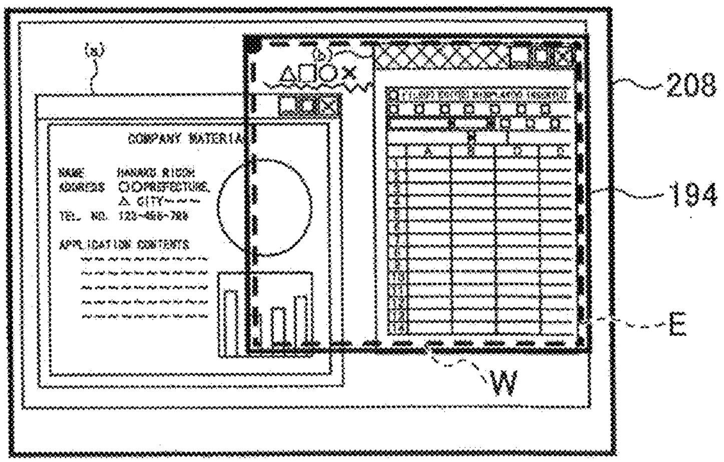

FIGS. 27A through 27C illustrate display examples of render applications in the display 208 connected to the external input device 40. In FIG. 27A, the area (b) is an active area, and therefore a frame line 194 is displayed at the area (b). The frame line 194 is formed so as to surround the area E of the render application, and therefore the frame line 194 is formed in contact with the area E of the render application (although the dotted line of area E is not displayed) on the outside of the area E.

In FIG. 27B, the frame line 194 is displayed at the entire area. It is difficult to Form the frame line 194 outside the entire area, and therefore the frame line 194 is formed in contact with the area E of the render application inside the area E. Alternatively, the area E of the render application may be reduced so as to be smaller than the entire area by the thickness of frame line 194, and the frame line 194 may be formed in contact with the area E outside the area E.

In FIG. 27C, the frame line 194 surrounding the area E of the render application larger than the active area (b) is displayed. The frame line 194 is formed in contact with the area E of the render application outside the area E. As illustrated in FIG. 27C, even when the area E of the render application has an arbitrary size that is larger than the area, the user can easily recognize the area E by the frame line 194.

As described above, the visible frame line 194 is displayed at the area E of the render application, and therefore the user can immediately recognize the location of the render application.

Note that the position of the frame line 194 may be appropriately set in consideration of the ease of viewing the display data. For example, the frame line 194 may be superposed along the outer edge of the area E of the render application, or may be formed inside the area E of the render application.

Furthermore, attributes of the frame line 194 such as the color, the degree of transparency, the line type (solid line, dotted line, dashed line), and the thickness may be set in advance, or may be arbitrarily selected by the user.

Incidentally, when the external input device 40 forms the frame line 194, the frame line 194 overlaps the display data of the area or the entire area, and the display data of the area or the entire area is slightly covered. Therefore, in the present embodiment, a description is given of a method of not only displaying the frame line 194, but also preventing a situation where the display data is hidden by displaying the frame line 194.

Forming and Taking in Frame Line

The functional blocks of the external input device 40 are the same as those illustrated in FIG. 6 (or FIG. 23); however, some of the functions are different. First, the render application control unit 45 of the external input device 40 according to the present embodiment does not only display the transparent area E of the render application, but also displays the frame line 194. Furthermore, the render data acquisition unit 44*b* takes in only the render contents in the area of the render application, and creates the render data 180. The combining unit 44*c* combines the render data 180 with the display data, without combining the frame line 194, to create display data in which figures, etc., are written in.

Figure 28A:
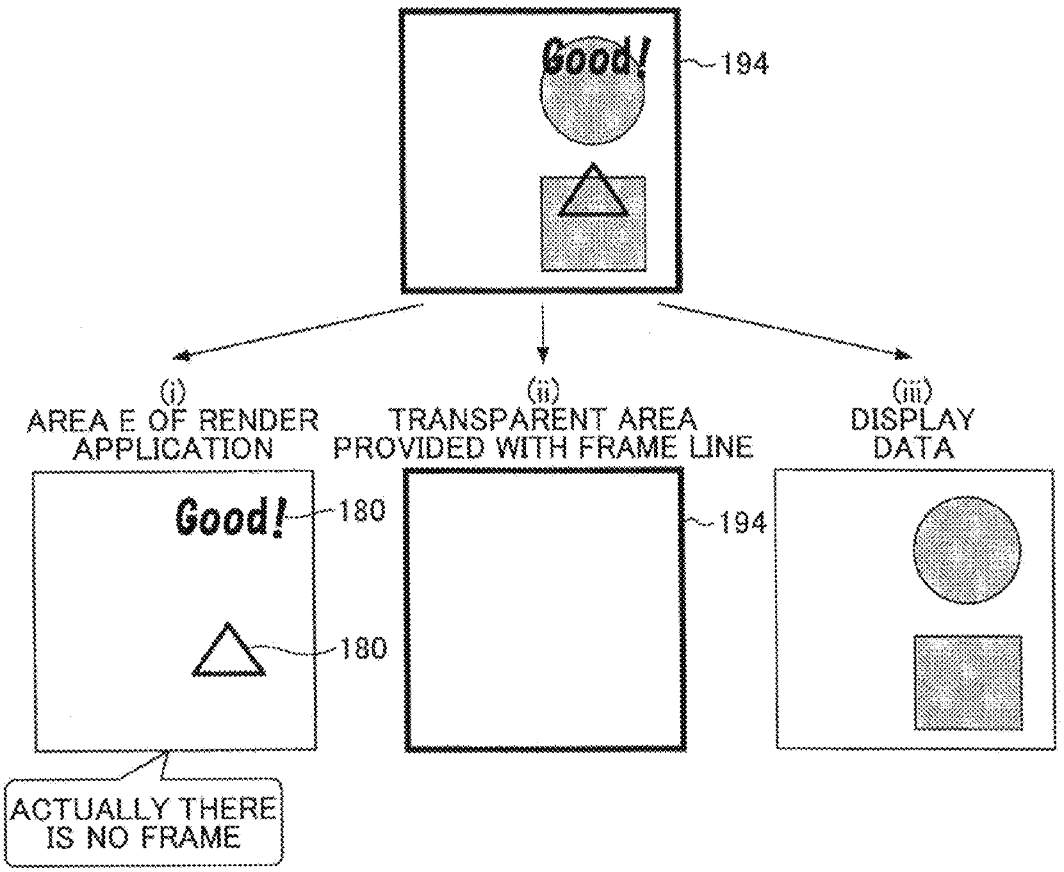
FIGS. 28A and 28B are for describing an example of displaying and combining the frame line.
Figure 28B:
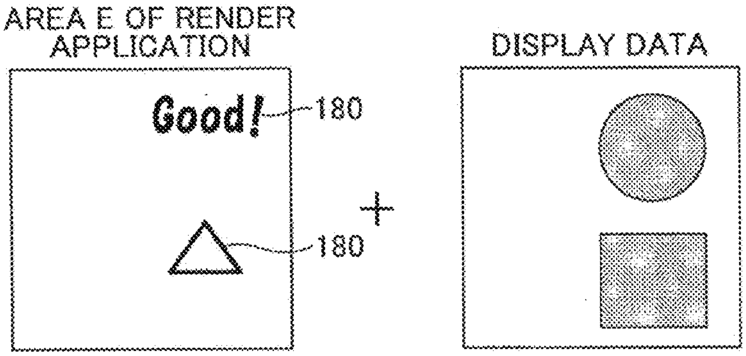

FIGS. 28A and 28B are for describing an example of displaying and combining the frame line 194. FIG. 28A illustrates an example of the area or the entire area displayed on the display 208 of the external input device 40. In this area, the following three areas are superposed.

(i) The area E of the render application (ii) The transparent area provided with the frame line 194.

(iii) The area where the display data is displayed.

Instead of only forming the visible frame line 194, by forming a transparent area provided with the frame line 194 as in (ii), the frame line 194 can also be handled as an area.

When the render application is activated, the render application control unit 45 displays the area E and the transparent area in the order of (i), (ii), from the direction of the user's line of sight. The area of the display data is on the far deep side as viewed from the user. By displaying the area E of (i) at the very front, the user can render the render contents. Furthermore, by displaying the transparent area of (ii) before the area (iii) where the display data is displayed, it is possible to prevent the frame line 194 from being hidden by the display data.

FIG. 28B illustrates an example of combining the render data 180 and the display data. The render data acquisition unit 44*b* creates the render data 180 from the render contents of the area E of the render application. The combining unit 44*c* combines only the render data 180 and the display data. Accordingly, the display data that the external input device 40 sends to the communication terminal 10*aa* does not include the frame line 194, and therefore the frame line 194 is not displayed in the display data that another communication terminal 10*db* displays on the display 120. Thus, it is possible to prevent the display data from being hidden by the frame line 194. Furthermore, only the user of the render application needs to know whether it is possible to render contents, and therefore it is highly unlikely that this user needs to show the frame line to the communication partner with which the display data is shared.

Note that even if the frame line 194 is added to the area E of the render application, the visible frame line 194 can be displayed; however, in this case, it is necessary to perform a process of excluding only the frame line 194 from the combining targets when combining the data. Meanwhile, in the present embodiment, (ii) the transparent area provided with the frame line 194 is created as a single area, and therefore only the transparent area is not to be combined when combining the data, which reduces the processing load.

Operation Procedures

Figure 29:
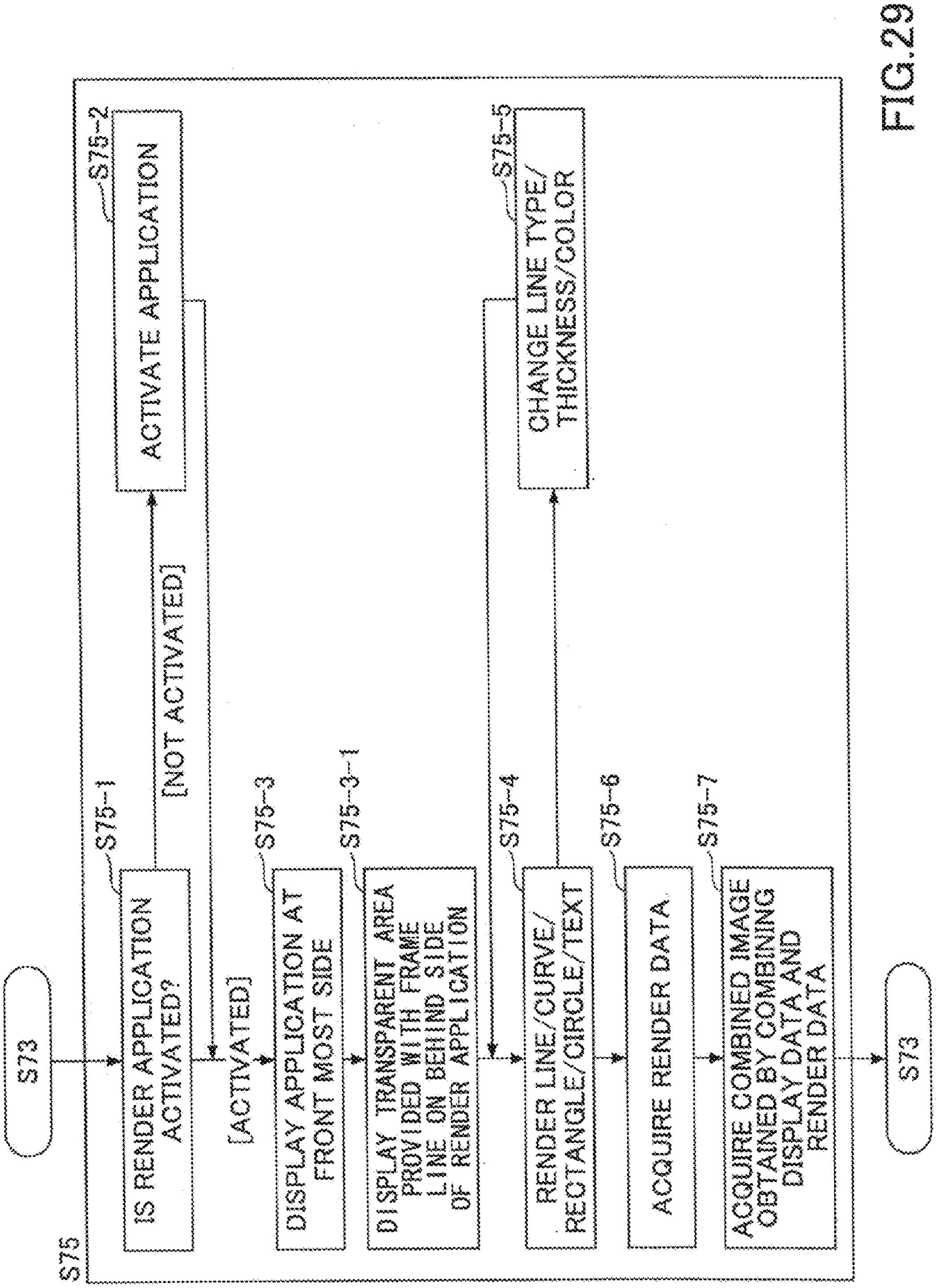
FIG. 29 is an example of a flowchart indicating procedures of controlling a render application performed by the keyhook DLL.

FIG. 29 is an example of a flowchart indicating procedures of controlling a render application performed by the keyhook DLL. In FIG. 29 the main steps of the present embodiment are described. Steps S75-1 through S75-3 are the same as those of FIG. 18.

In step S75-3, when the render application control unit 45 displays the render application, the render application control unit 45 displays the transparent area provided with the frame line 194 on the behind side of the render application (step S75-3-1). That is to say, as the render application becomes active, the transparent area provided with the frame line 194 is also displayed.

Steps S75-4 through S75-6 are the same as those of FIG. 18. Then, the combining unit 44*c* combines the render data 180 with the display data acquired by the display data acquisition unit 43*c* (step S75-7). In this case, the combining unit 44*c* does not combine the transparent area provided with the frame line 194 with the display data.

Therefore, in the external input device 40 according to the present embodiment, when the render application is active, the visible frame line 194 is displayed, and therefore the user can immediately recognize whether the render application is active or inactive. Furthermore, the display data sent to the communication terminal 10*db* is not combined with the transparent area provided with the frame line 194, and therefore it is possible to prevent a situation where the render data 180 or the display data becomes hard to see.

Transmittance when Transparent Area Provided with Frame Line is Displayed

In FIG. 28A, three windows (i), (ii), (iii) are displayed, from the viewpoint of the user. Furthermore, by setting the transmittance of the transparent area provided with the frame line to, for example, 100%, the user can render contents in the render application without considering the transparent area provided with the frame line.

However, when the transmittance of the transparent area provided with the frame line and the transmittance of the render application are both 100%, and the transmittance of the display data is 100% (at least part of the display data is 100%), a window may be overlapping behind the display data.

Figure 30A:
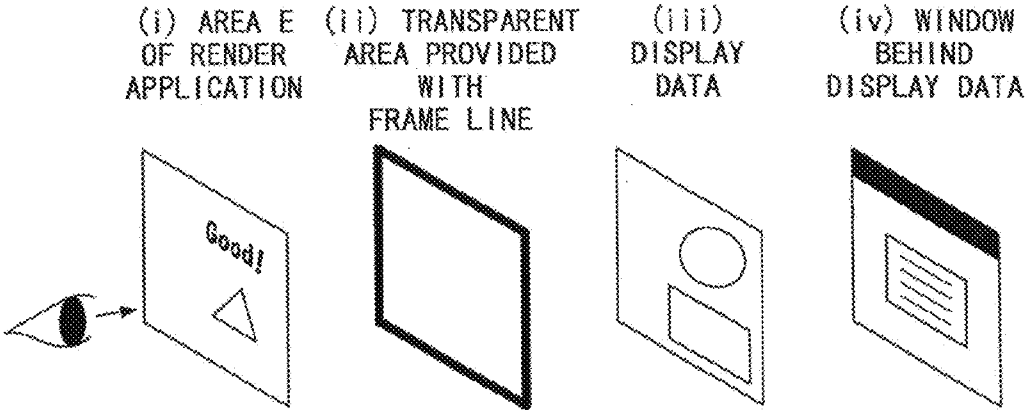
FIGS. 30A through 30C schematically illustrate examples of an area E of the render application, a transparent area provided with a frame line, display data, and a window behind the display data.

FIG. 30A schematically illustrates an example of the area E of the render application, the transparent area provided with the frame line, the display data, and the window behind the display data. In this case, when the user clicks an area having a transmittance of 100% in all of (i), (ii), (iii), the (iv) window behind the display data is selected, and therefore the render area to be the target of the combining is unintentionally changed.

Furthermore, as a matter of course, in a case where there is no (ii) transparent area provided with the frame line, and the (i) area E of the render application, the (iii) display data, and the (iv) window behind the display data are superposed, when the transmittance of the (i) area E of the render application and the (iii) display data is 100%, the (iv) window behind the display data will be unintentionally selected.

Therefore, it is preferable to form a transparent area provided with the frame line, and set the transparency of the transparent area provided with the frame line to a value close to transparent that is less than 100% (for example, 99.6%). By setting the transparency at less than 100%, it is possible to prevent the (iv) window behind the display data from being selected. Note that the transparency of the transparent area provided with the frame line is not limited to, for example, 99.6%; the transparency may be a value at a which the (iv) window behind the display data will not be selected, among values that the user can deem as transparent (for example, 90% through 99.9%) (for example, the user may select the highest transparency among the transparency values at which the (iv) window behind the display data will not be selected).

The size of the transparent area provided with the frame line may be the same as the area E of the render application, or a size larger than the area E of the render application just by the thickness of the frame line; however, the size of the transparent area provided with the frame line may larger than the area E of the render application.

Figure 30B:
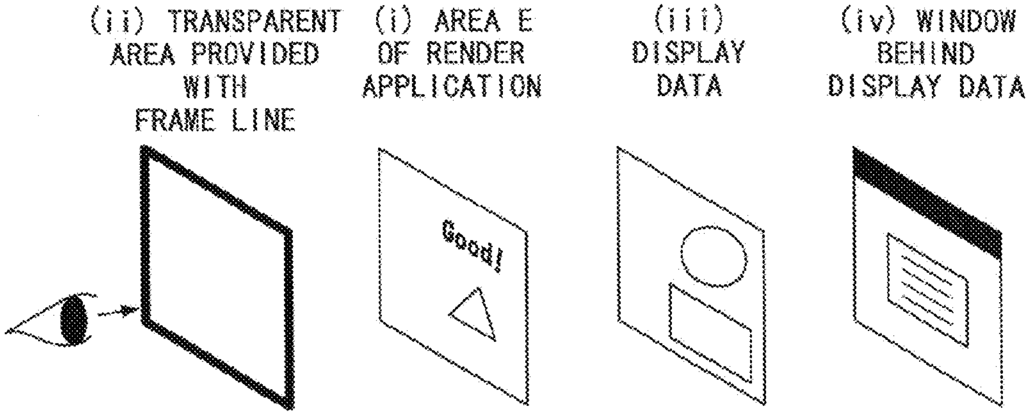

Furthermore, as illustrated in FIG. 30B, the order of superposing the windows (i) through (iii) may be in the order of (ii), (i), (iii) from the viewpoint of the user. In this case, the user renders characters in the (ii) transparent area provided with the frame line, and therefore the render application cannot acquire the render data 180. Therefore, the window of the (ii) transparent area provided with the frame line reports the trajectory of the pointer such as the mouse or a fingertip (coordinate data of time series) to the render application. The render application receives the coordinate data, and the render application renders the contents in the window of the (i) area E of the render application. Note that the communication between windows may performed by using the mechanism of inter-process communications provided by the OS, and coordinate data (trajectory) can be transmitted/received between windows. The window of the transparent area provided with the frame line and the window of the area of the render application may be created by the render application.

Figure 30C:
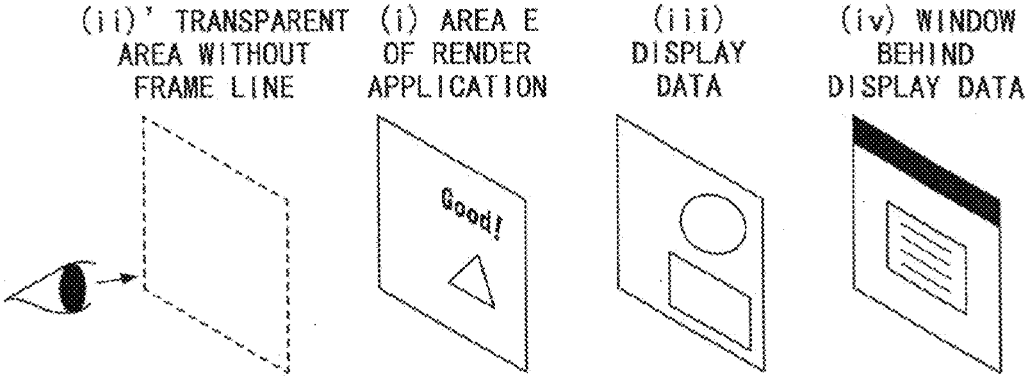

If the frame line is unnecessary, as illustrated in FIG. 30C, the render application control unit 45 forms a (ii) transparent area without a frame line. Then, the transparency of the transparent area is set to be less than 100%. In FIG. 30C also, the (i) area E of the render application is to be arranged closer to the viewpoint of the user than the (ii) transparent area provided with the frame line.

Note that the inconvenience that the (iv) window behind the display data is selected, is apt to occur by a UI created by a particular OS. A particular OS means OS such as Windows® in which the Aero UI is turned off, and Windows® XP using a UI having a relatively low visual effect.

As described above, by appropriately setting the transmittance of the transparent area provided with the frame line, even if the render application is operated on a particular OS, the window behind the display data is not selected, and the user can surely render contents in the window that is presently selected (the window of the render application or the window of the transparent area provided with the frame line).

Fourth Embodiment

In the present embodiment, a description is given of the external input device 40 capable of acquiring render data intended by the user, in an OS creating a UI with visual effects.

Figure 31:
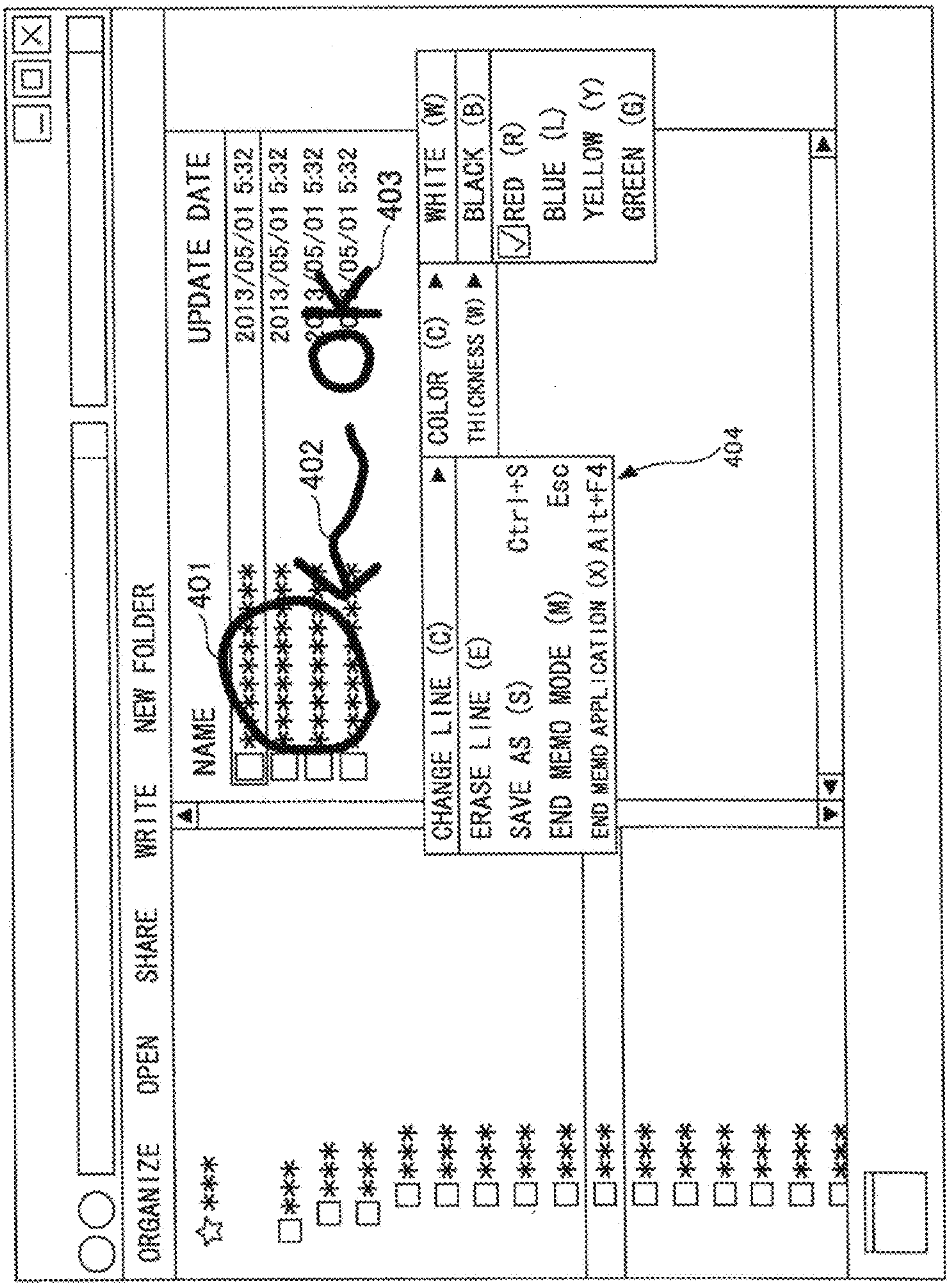
FIG. 31 illustrates an example of an inconvenience caused when acquiring render data.

FIG. 31 illustrates an example of an inconvenience caused when acquiring render data. In FIG. 31, the transparent area provided with the frame line and the area E of the render application are superposed on the display data. The user uses the render application to render a circle 401, an arrow 402, and characters of OK 403. The rendered contents are acquired by the render data acquisition unit 44*b* and combined with the display data, and sent to the communication terminal 10 that is the communication partner.

However, apart from the operation of combining the render data with the display data, user may want to save the render data. To meet such a request, the render application can display an operation menu 404. For example, when the user right-clicks the mouse, the render application displays the operation menu 404 of the render application. In the operation menu 404, for example, “change line”, “erase line”, “save as”, “end memo mode”, and “end render application” are displayed. When the user selects “save as”, the render application saves the render data (the circle 401, the arrow 402, and the characters of OK 403).

The render application receives the user operation of “save as” and saves the render data; however, when the OS creating a UI having a visual effect erases the operation menu 404, the OS gradually lightens the shade of the operation menu 404. For this reason, the operation menu 404 that is in the process of being erased is unintentionally included in the render data acquired by the render application, and the render data may not be what the user desires.

Thus, in the present embodiment, the render application takes in the render data at the time point when the user right-clicks the mouse and displays the operation menu 404, so that the operation menu 404 that is in the process of being erased is prevented from being included in the render data.

Figure 32:
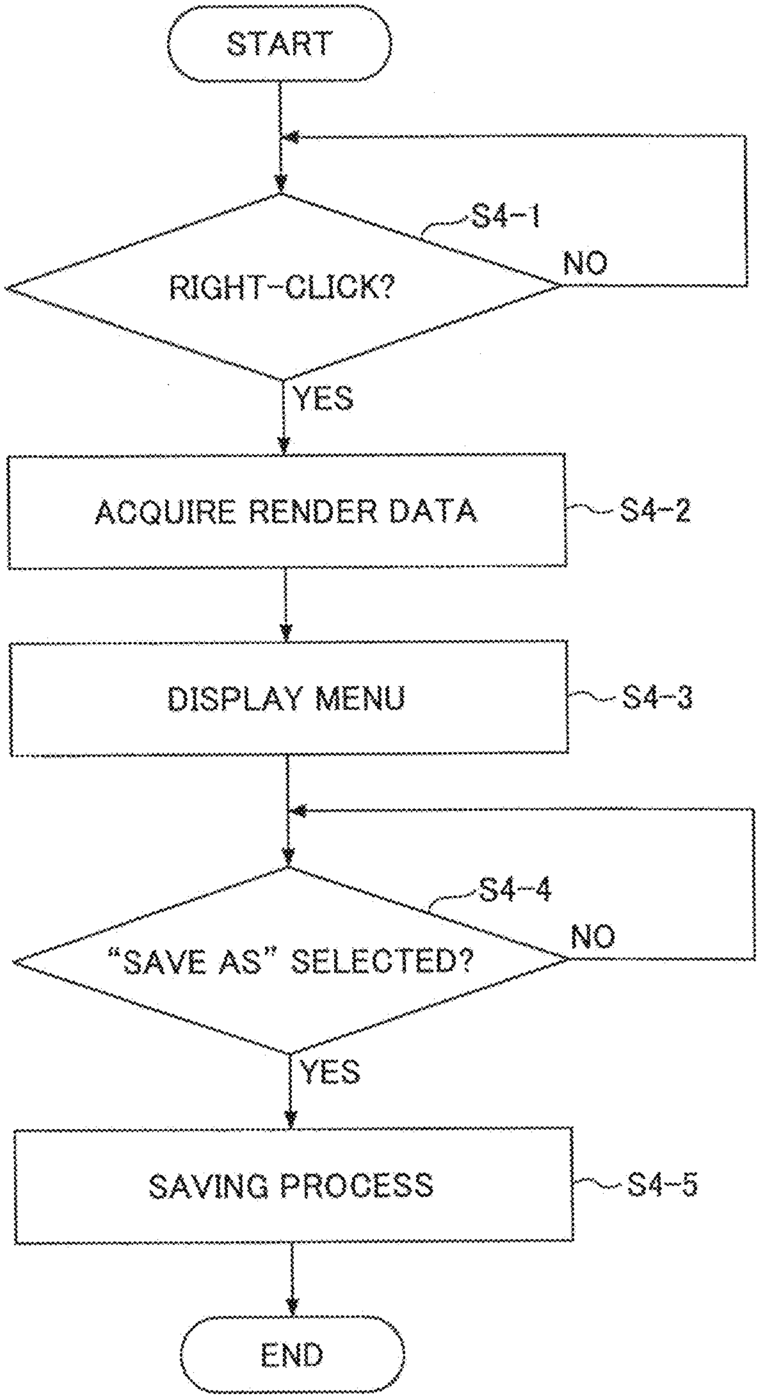
FIG. 32 is an example of a flowchart indicating procedures for saving the render data performed by the render application.
Figure 33:
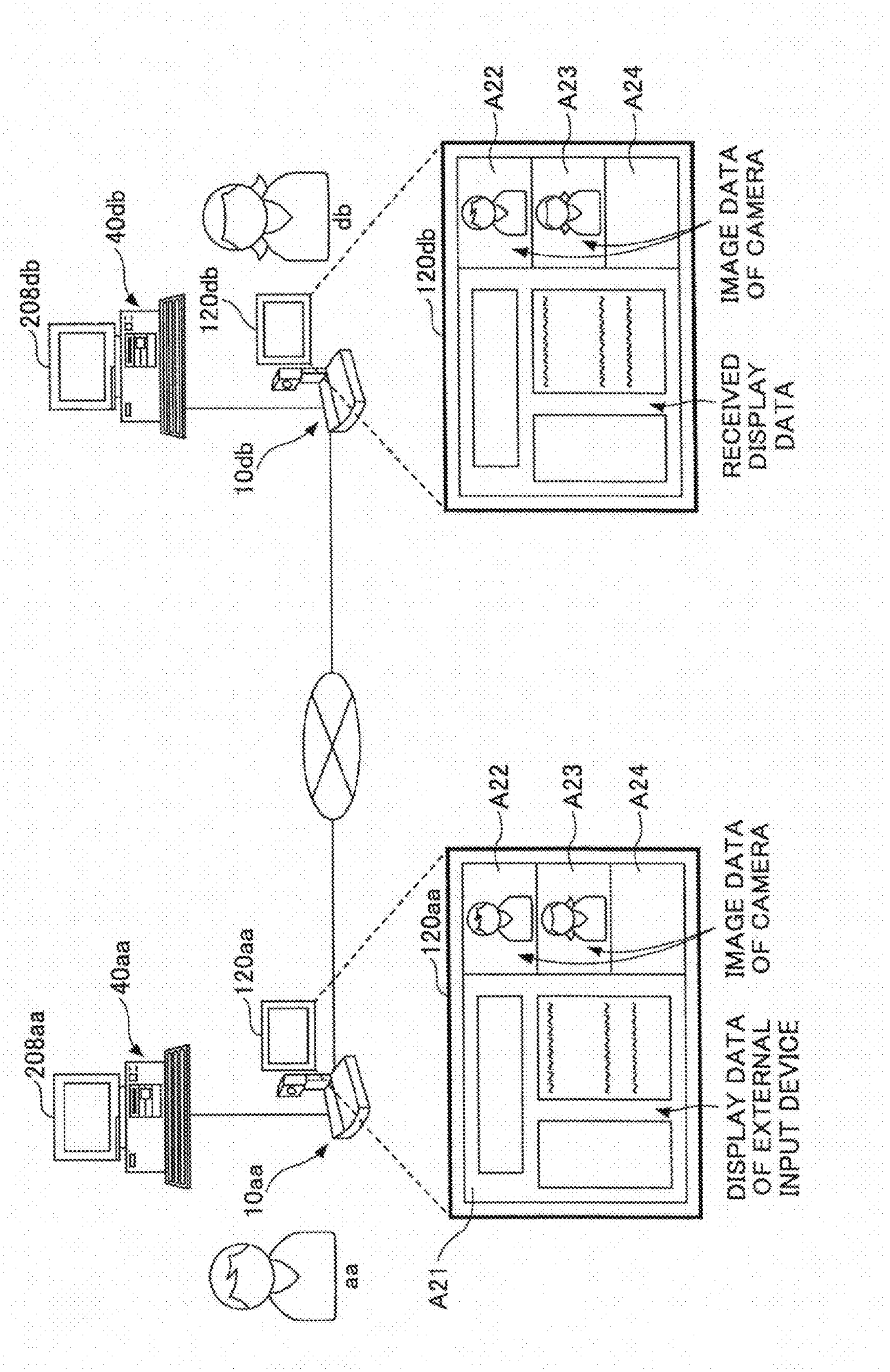
FIG. 33 illustrates an example of a schematic configuration diagram of a remote conference system in which an application screen of a PC can be shared.

FIG. 32 is an example of a flowchart indicating procedures for saving the render data performed by the render application. FIG. 32 illustrates procedures that are executed for saving the render data while avoiding the above inconvenience, when the render application is activated.

The operation input receiving unit 46 determines whether a right-click has been pressed (step S4-1). The right-click is detected because this is an operation for displaying the operation menu 404; if there is another operation for displaying the operation menu 404, another operation is detected. For example, when the saving function is assigned to predetermines keys of the keyboard (for example, Ctrl key+S key), the pressing of these keys is detected.

When a right-click is detected (YES in step S4-1), before displaying the operation menu 404, the render data acquisition unit 44*b* acquires the render data rendered in the area E of the render application. The render data is temporarily saved in the storage unit 4000 (step S4-2).

Then, the render application displays the operation menu 404 (step S4-3). Therefore, it is possible to save render data in which the operation menu 404 is not shown.

The operation input receiving unit 46 determines whether "save as" has been selected (step S4-4).

When "save as" has been selected (YES in step S4-4), the render data acquisition unit 44*b* performs a saving process (step S4-5). For example, the saving process is a process for displaying a UI for applying a file name to the render data. When the user applies a file name, a file name is applied to the render data stored in the storage unit 4000, and the render data is saved in a folder specified by the user. The render data and the display data are displayed in a combined state, and therefore by saving the render data and the display data in a combined state, the process of displaying the data on the display 208*aa* is facilitated. Furthermore, the render data and the display data may be separately saved.

Thus, by the external input device 40 according to the present embodiment, even when render data is acquired by a render application, which operates on an OS creating a UI having a visual effect, it is possible to acquire render data in which the operation menu 404 is not shown.

According to one embodiment of the present invention, a communication system is provided, which is capable of flexibly forming an area for rendering contents into data that is shared.

The communication system and the information processing device according to an embodiment of the present invention are not limited to the specific embodiments described herein, and variations and modifications may be made without departing from the spirit and scope of the present invention.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of she apparatus as long as the HDD is accessible. In this example, the CPU, such as a cache memory of the CPU, and the RAM may function as a physical memory or a primary memory of the apparatus, while the HDD may function as a secondary memory of the apparatus.

The present application is based on and claims the benefit of priority of Japanese Priority Patent Application No. 2013-123896, filed on Jun. 12, 2013, Japanese Priority Patent Application No. 2013-210448, filed on Oct. 7, 2013, and Japanese Priority Patent Application No. 2014-016954, filed on Jan. 31, 2014, the entire contents of which are hereby incorporated herein by reference.

What is claimed is:

1. A communication system comprising:
a terminal;
an information processing device that is communicably connected with the terminal; and
another terminal that is communicably connected with the terminal via a network, wherein
the information processing device includes a processor configured to:
control display of display data in an arbitrary area formed in a first display of the information processing device,
capture the display data displayed in an operation reception area or an entire area, which is a target of receiving an operation by a user,
form a render reception area so as to be superposed on the operation reception area or the entire area,
receive rendering with respect to the render reception area, wherein the display data in the operation reception area or the entire area is captured without render data rendered in the render reception area,
acquire the render data rendered in the render reception area without inclusion of the display data,
combine the captured display data with the render data, and
send, to the terminal, the display data with which the render data has been combined,
the terminal includes a processor configured to:
receive the display data with which the render data has been combined,
control display of the display data on a second display connected to the terminal, and
send the display data to the another terminal,
the processor of the information processing device is configured to send, to the terminal, each of the render data and the display data, before combining the display data with the render data,
the processor of the terminal is configured to receive the render data and the display data,
the terminal includes:
an imaging device configured to take an image of a surrounding area and create image data, and
a memory in which a setting is made indicating whether the display data is shared with the another terminal, and
the processor of the terminal is configured to:
combine the render data with the display data when the setting in the memory indicates that the display data is shared with the another terminal, combine the render data with the image data when the setting in the memory indicates that the display data is not shared with the another terminal, control display, on the second display, of the display data or the image data, with which the render data has been combined, and send, to the another terminal, the display data or the image data, with which the render data has been combined.

2. The communication system according to claim 1, wherein the processor of the information processing device is configured to:

acquire, from a predetermined program, a position and a size of the operation reception area, and form the render reception area that is transparent at the same position and size as the operation reception area.

3. The communication system according to claim 2, wherein the processor of the information processing device is configured to detect that the operation reception area has been switched, and every time the operation reception area is switched, the processor of the information processing device acquires the position and the size of the operation reception area, and forms the render reception area at the same position and size as the operation reception area.

4. The communication system according to claim 2, wherein when the processor of the information processing device receives a change in a position or a size of the render reception area, or when the render reception area and the operation reception area have a different position or size, the processor of the information processing device:

sets, in a workspace, a rectangular area including both the operation reception area and the render reception area, acquires the render data from the render reception area in the workspace, acquires the display data from the operation reception area in the workspace, and combines the render data and the display data in the workspace.

5. The communication system according to claim 2, wherein when the operation reception area is switched, the processor of the information processing device:

saves render contents and identification information of the operation reception area in association with each other, the render contents being received at the render reception area before the operation reception area is switched, reads render contents stored in association with identification information of the operation reception area after the operation reception area is switched, and displays the read render contents in the render reception area.

6. The communication system according to claim 1, wherein the processor of the terminal is configured to:

divide a screen of the second display, and display, together with the display data, the image data taken by the imaging device connected to the terminal, and image data taken by an imaging device connected to the another terminal and sent by the another terminal.

7. The communication system according to claim 1, wherein the processor of the information processing device is configured to control display of a visible line along an outer edge of the render reception area.

8. The communication system according to claim 7, wherein the processor of the information processing device is configured to form a transparent area with a frame line applied along an outer edge of the transparent area, so as to be superposed on the render reception area.

9. The communication system according to claim 8, wherein the processor of the information processing device is configured to set a transparency of the transparent area at less than 100%.

10. The communication system according to claim 8, wherein the processor of the information processing device is configured to:

form the transparent area, the render reception area, and the operation reception area, in the stated order from a viewpoint side, acquire render contents rendered in the transparent area from the transparent area, and render the acquired render contents in the render reception area.

11. The communication system according to claim 1, wherein the processor of the information processing device is configured to detect an operation of displaying an operation menu, when the processor of the information processing device detects the operation, the processor of the information processing device temporarily saves the render data which does not include image data of the operation menu, and when the first display displays the operation menu, and an operation to save the render data is received from the operation menu, the processor of the information processing device saves the render data that has been temporarily saved.

12. The communication system according to claim 1, wherein the processor of the information processing device is configured to detect an operation of displaying an operation menu, when the processor of the information processing device detects the operation, the processor of the information processing device temporarily saves the display data that has been combined with the render data which does not include image data of the operation menu, and when the first display displays the operation menu, and an operation to save the render data is received from the operation menu, the processor of the information processing device saves the render data that has been combined with the display data and temporarily saved.

13. The communication system according to claim 1, wherein when the user has not selected an area to be the operation reception area or selects the total display area of the first display to be operation reception area, the display data of the total display area of the first display is acquired as the operation reception area and the render reception area is generated to be the total display area of the first display.

14. The communication system according to claim 1, wherein the processor of the terminal is configured to enlarge the combined display data and render data to be displayed in a predetermined area of the second display.

15. The communication system according to claim 1, wherein the display data and render data are combined by setting a same origin point for each of the display data and render data and replacing pixels of the display data with non-transparent pixels of the render data.

16. The communication system according to claim 1, wherein the processor of the information processing apparatus is configured to form the render reception area so as to be superposed on the operation reception area or the entire area when the operation reception area or the entire area is selected by the user, the render reception area being automatically generated to be transparent.

17. An information processing device that is communicably connected with a terminal, wherein the terminal includes a processor configured to receive display data from the information processing device, control display the display data on a second display connected to the terminal, and send the display data to another terminal that is communicably connected with the terminal via a network; an imaging device configured to take an image of a surrounding area and create image data and a memory in which a setting is made indicating whether the display data is shared with the another terminal, the information processing device comprising:

a processor configured to control display of display data in an arbitrary area formed in a first display of the information processing device, capture the display data displayed in an operation reception area or an entire area, which is a target of receiving an operation by a user, form a render reception area so as to be superposed on the operation reception area or the entire area, receive rendering with respect to the render reception area, wherein the display data in the operation reception area or the entire area is captured without render data rendered in the render reception area, acquire the render data rendered in the render reception area without inclusion of the display data, combine the captured display data with the render data, send, to the terminal, the display data with which the render data has been combined, and send, to the terminal, each of the render data and the display data, before combining the display data with the render data, wherein the processor of the terminal is configured to:

receive the render data and the display data, combine the render data with the display data when the setting in the memory indicates that the display data is shared with the another terminal, combine the render data with the image data when the setting in the memory indicates that the display data is not shared with the another terminal, control display, on the second display, of the display data or the image data, with which the render data has been combined, and send, to the another terminal, the display data or the image data, with which the render data has been combined.

18. A non-transitory computer-readable recording medium storing a program that causes an information processing device to execute a process, the information processing device being communicably connected with a terminal, wherein the terminal includes a processor configured to receive display data from the information processing device, control display the display data on a second display connected to the terminal, and send the display data to another terminal that is communicably connected with the terminal via a network; an imaging device configured to take an image of a surrounding area and create image data; and a memory in which a setting is made indicating whether the display data is shared with the another terminal, wherein the program causes the information processing device to execute a method comprising:

controlling display of display data in an arbitrary area formed in a first display of the information processing device, capturing the display data displayed in an operation reception area or an entire area, which is a target of receiving an operation by a user, forming a render reception area in which the display data is visible, such that the render reception area is superposed on the operation reception area or the entire area, receiving rendering with respect to the render reception area, wherein the display data in the operation reception area or the entire area is captured without render data rendered in the render reception area, acquiring the render data rendered in the render reception area without inclusion of the display data, sending, to the terminal, each of the render data and the display data, before combining the display data with the render data, the processor of the terminal:

receiving the render data and the display data, combining the render data with the display data when the setting in the memory indicates that the display data is shared with the another terminal, combining the render data with the image data when the setting in the memory indicates that the display data is not shared with the another terminal, controlling display, on the second display, of the display data or the image data, with which the render data has been combined, and sending, to the another terminal, the display data or the image data, with which the render data has been combined.

* * * * *